United States Patent
Ryu et al.

(10) Patent No.: US 11,212,842 B2
(45) Date of Patent: Dec. 28, 2021

(54) SIGNALING SUPPORT OF REFERENCE SIGNAL REPETITION IN DUAL CONNECTED CASE

(71) Applicant: QUALCOMM Incorporated, San Diego, CA (US)

(72) Inventors: Jung Ho Ryu, Fort Lee, NJ (US); Makesh Pravin John Wilson, San Diego, CA (US); Tao Luo, San Diego, CA (US); Yan Zhou, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/533,447

(22) Filed: Aug. 6, 2019

(65) Prior Publication Data
US 2020/0053792 A1 Feb. 13, 2020

Related U.S. Application Data

(60) Provisional application No. 62/716,188, filed on Aug. 8, 2018.

(51) Int. Cl.
*H04W 74/08* (2009.01)
*H04W 74/02* (2009.01)
(Continued)

(52) U.S. Cl.
CPC ....... *H04W 74/0833* (2013.01); *H04L 5/0051* (2013.01); *H04W 56/001* (2013.01);
(Continued)

(58) Field of Classification Search
None
See application file for complete search history.

(56) References Cited

U.S. PATENT DOCUMENTS

| 10,659,123 B2* | 5/2020 | Lee | H04B 7/0626 |
| 2015/0271768 A1* | 9/2015 | Jang | H04W 52/367 370/329 |

(Continued)

OTHER PUBLICATIONS

AT&T: "PRACH Design for NR", 3GPP Draft; R1-1707756 PRACH Design for NR, 3rd Generation Partnership Project (3GPP), Mobile Competence Centre, 650, Route Des Lucioles, F-06921, Sophia-Antipolis Cedex, France, vol. RAN WG1, No. Hangzhou, China, May 15, 2017-May 19, 2017 May 7, 2017 (May 7, 2017), XP051263107, Retrieved from the Internet:URL:http://www.3gpp.org/ftp/tsg_ran/WG1_RL1/TSGR1 89/Docs/[retrieved on May 7, 2017]sections 1-3.

(Continued)

*Primary Examiner* — Anh Ngoc M Nguyen
(74) *Attorney, Agent, or Firm* — Holland & Hart LLP

(57) ABSTRACT

A master node associated with a primary or master network may facilitate user equipment (UE) random access channel (RACH) procedures to secondary networks for dual connectivity. A master node may identify a connected UE is to perform a RACH procedure for connection with a secondary network (e.g., to the same network as the primary network via a secondary node). The master node may then identify a transmit beam for the secondary node to use for reference signal repetitions based on a beam report received from the UE. The master node may transmit an indication of the repetition, which may include a number of repetitions and/or a transmit beam to be used for the reference signals of the RACH procedure. The UE may perform a receive beam sweep procedure while the secondary node transmits the reference signal repetitions on the transmit beam to identify a preferred receive beam.

44 Claims, 18 Drawing Sheets

(51) Int. Cl.
*H04W 56/00* (2009.01)
*H04W 72/04* (2009.01)
*H04L 5/00* (2006.01)
*H04W 76/15* (2018.01)

(52) U.S. Cl.
CPC ......... *H04W 72/046* (2013.01); *H04W 74/02* (2013.01); *H04W 76/15* (2018.02)

(56) References Cited

U.S. PATENT DOCUMENTS

| | | | | |
|---|---|---|---|---|
| 2017/0251460 | A1* | 8/2017 | Agiwal | H04W 72/0406 |
| 2018/0249461 | A1* | 8/2018 | Miao | H04W 24/10 |
| 2019/0097772 | A1* | 3/2019 | Yang | H04L 27/2605 |
| 2020/0068616 | A1* | 2/2020 | Qian | H04W 74/0833 |
| 2020/0280466 | A1* | 9/2020 | Cui | H04B 7/0617 |
| 2021/0051663 | A1* | 2/2021 | Chen | H04W 72/042 |
| 2021/0076271 | A1* | 3/2021 | Jokela | H04W 36/36 |

OTHER PUBLICATIONS

Guangdong Oppo Mobile Telecom: "Discussion on Random Access Procedure for NR", 3GPP Draft; R1-1700548, 3rd Generation Partnership Project (3GPP), Mobile Competence Centre, 650, Route Des Lucioles, F-06921 Sophia-Antipolis Cedex, France, vol. RAN WG1, No. Spokane, USA; Jan. 16, 2017-Jan. 20, 2017 Jan. 16, 2017, XP051208078, Retrieved from the Internet: URL:http://www.3gpp.org/ftp/Meetings_3GPP_SYNC/RAN1/Docs/ [retrieved on Jan. 16, 2017] Section 2, 3 pages.

Huawei et al., "NR Paging Options", 3GPP Draft; R2-1808440, NR Paging Options, 3rd Generation Partnership Project (3GPP), Mobile Competence Centre, 650, Route Des Lucioles, F-06921 Sophia-Antipolis Cedex, France, vol. RAN WG2, No. Busan, Korea; May 21, 2018-May 25, 2018 May 20, 2018, XP051444714, Retrieved from the Internet: URL:http://www.3gpp.org/ftp/Meetings%5F3GPP%5FSYNC/RAN2/Docs/ [retrieved on May 20, 2018], p. 1, lines 1-12, paragraph 1, p. 2, lines 11-16, paragraph 2, p. 3, lines 1-19, 25, paragraph 2.1, figure 1, 11 pages.

International Search Report and Written Opinion—PCT/US2019/045552—ISA/EPO—dated Nov. 6, 2019.

Mitsubishi Electric: "RACH Procedure in Non-Standalone Operation", 3GPP Draft; R1-1707054_RACH_NSA, 3rd Generation Partnership Project (3GPP), Mobile Competence Centre, 650, Route Des Lucioles, F-06921, Sophia-Antipolis Cedex, France, vol. RAN WG1, No. Hangzhou, China; May 15, 2017-May 19, 2017 May 14, 2017, XP051272284, Retrieved from the Internet: URL:http://www.3gpp.org/ftp/Meetings_3GPP_SYNC/RAN1/Docs/ [retrieved on May 14, 2017], p. 4, figure 3, 6 pages.

Oppo: "Further discussion on Open Issues for RACH Resource Handling and usage during handover", 3GPP Draft; R2-1708366 Further discussion on Open Issues for RACH Resource Handling and usage during handover, 3rd Generation Partnership Project (3GPP), Mobile Competence Centre, 650, Route Des Lucioles, F-06921 Sophia-Antipolis Cedex, France, vol. RAN WG2, No. Berlin, Germany; Aug. 21, 2017-Aug. 25, 2017 Aug. 20, 2017, XP051318241, Retrieved from the Internet: URL:http://www.3gpp.org/ftp/Meetings_3GPP_SYNC/RAN2/Docs/ [retrieved on Aug. 20, 2017] Section 2, 3 pages.

\* cited by examiner

SIGNALING SUPPORT OF REFERENCE SIGNAL REPETITION IN DUAL CONNECTED CASE

CROSS REFERENCES

The present Application for Patent claims the benefit of U.S. Provisional Patent Application No. 62/716,188 by LASTNAME et al., entitled "SIGNALING SUPPORT OF REFERENCE SIGNAL REPETITION IN DUAL CONNECTED CASE," filed Aug. 8, 2018, assigned to the assignee hereof, and expressly incorporated herein.

BACKGROUND

The following relates generally to wireless communications, and more specifically to signaling support of reference signal repetition in dual connected case.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may provide for dual connectivity where a UE may receive data transmitted by two network nodes to improve data throughput. One network node may be a base station using a first radio access technology (RAT) in a radio access network (RAN) (e.g., an NR base station), and another network node may be a base station using a second RAT, or the same first RAT, in the RAN (e.g., an NR base station or an LTE base station). To establish a dual connectivity connection, a UE connected to a primary or master network node (e.g., a base station using LTE or NR in a wireless communications system) may perform a connection establishment procedure (e.g., such as a random access channel (RACH) procedure or a radio resource control (RRC) procedure, such as an RRC reconfiguration procedure) with a secondary network node (e.g., a base station using NR in the wireless communications system). The connection establishment procedure may involve the UE accessing a cell and transmitting a connection request (e.g., a RACH request) to the secondary network node. In some cases, some of the network nodes may use directional beamforming, and these connection establishment procedures may be associated with undesirable latency as the connections are established. Improved techniques for establishing secondary connections for dual connectivity communications may be desirable to enhance network efficiency.

SUMMARY

The described techniques relate to improved methods, systems, devices, and apparatuses that support reference signal repetition signaling in dual connected case. Generally, the described techniques provide for a master or primary network node facilitating user equipment (UE) connection establishment procedures (e.g., random access channel (RACH) procedures) to secondary network nodes. A master node may identify a connected UE (e.g., a UE connected to the master node network) is to perform a RACH procedure for the UE to establish a secondary connection with the network via a secondary network node. The master node may then identify a transmit beam for the secondary node to use for reference signal repetitions based on a beam report received from the UE. The master node may transmit an indication of the repetition to be used for the reference signals of the RACH procedure to both the UE and the secondary node. In some cases, these indications may include indication of a number of repetitions for the reference signal repetition, the transmit beam to be used by the secondary node (e.g., an index or other indicator that identifies the transmit beam) for the reference signal repetitions, or both.

The UE may perform a receive beam sweep procedure while the secondary node transmits the reference signal repetitions on the transmit beam. The UE may then identify a preferred receive beam based on the one or more received reference signals, and may transmit a RACH transmission to the secondary node in response to the received reference signals. The UE and the secondary node may then complete the RACH procedure (e.g., using the UE's preferred receive beam), and the UE may transition to dual connectivity operation with both the master node and the newly-connected secondary node.

A method of wireless communication at a UE is described. The method may include receiving, from a first base station with which the UE is connected, an indication that a second base station will transmit a reference signal in repetition on a transmit beam during a RACH procedure for the UE to establish a second connection with the second base station. The method may further include receiving the reference signal from the second base station during the RACH procedure according to the received indication and identifying a preferred receive beam for the UE based on the received reference signal.

An apparatus for wireless communication at a UE is described. The apparatus may include a processor, memory in electronic communication with the processor, and instructions stored in the memory. The instructions may be executable by the processor to cause the apparatus to receive, from a first base station with which the UE is connected, an indication that a second base station will transmit a reference signal in repetition on a transmit beam during a RACH procedure for the UE to establish a second connection with the second base station. The instructions may be executable by the processor to further cause the apparatus to receive the reference signal from the second base station during the RACH procedure according to the received indication and identify a preferred receive beam for the UE based on the received reference signal.

Another apparatus for wireless communication at a UE is described. The apparatus may include means for receiving, from a first base station with which the UE is connected, an indication that a second base station will transmit a reference signal in repetition on a transmit beam during a RACH procedure for the UE to establish a second connection with the second base station. The apparatus may further include means for receiving the reference signal from the second base station during the RACH procedure according to the received indication and means for identifying a preferred receive beam for the UE based on the received reference signal.

A non-transitory computer-readable medium storing code for wireless communication at a UE is described. The code may include instructions executable by a processor to receive, from a first base station with which the UE is connected, an indication that a second base station will transmit a reference signal in repetition on a transmit beam during a RACH procedure for the UE to establish a second connection with the second base station, receive the reference signal from the second base station during the RACH procedure according to the received indication, and identify a preferred receive beam for the UE based on the received reference signal.

Some examples of the method, apparatuses, and non-transitory computer-readable medium described herein may further include operations, features, means, or instructions for receiving an indication of a number of repetitions for the reference signal and monitoring for the reference signal according to the indicated number of repetitions. Some examples of the method, apparatuses, and non-transitory computer-readable medium described herein may further include operations, features, means, or instructions for receiving an indication of the transmit beam to be used by the second base station to transmit the reference signal in repetition and monitoring for the reference signal according to the indicated transmit beam. In some examples of the method, apparatuses, and non-transitory computer-readable medium described herein, receiving the reference signal may include operations, features, means, or instructions for performing a receive beam sweep to receive the reference signal, where the preferred receive beam may be identified based on the receive beam sweep.

In some examples of the method, apparatuses, and non-transitory computer-readable medium described herein, the reference signal includes a channel state information reference signal (CSI-RS). In some examples of the method, apparatuses, and non-transitory computer-readable medium described herein, the RACH procedure may be a contention-free RACH procedure. In some examples of the method, apparatuses, and non-transitory computer-readable medium described herein, the reference signal includes at least a portion of a synchronization signal block (SSB). Some examples of the method, apparatuses, and non-transitory computer-readable medium described herein may further include operations, features, means, or instructions for receiving an indication of a SSB transmission mode for the SSB. In some examples of the method, apparatuses, and non-transitory computer-readable medium described herein, the SSB transmission mode includes a synchronization raster SSB mode or a UE-specific off-raster mode. Some examples of the method, apparatuses, and non-transitory computer-readable medium described herein may further include operations, features, means, or instructions for receiving an indication of a quasi co-location relationship between the SSB and a synchronization raster SSB. In some examples of the method, apparatuses, and non-transitory computer-readable medium described herein, the RACH procedure may be a contention-based RACH procedure.

In some examples of the method, apparatuses, and non-transitory computer-readable medium described herein, the indication may be received in radio resource control signaling. Some examples of the method, apparatuses, and non-transitory computer-readable medium described herein may further include operations, features, means, or instructions for transmitting a beam report to the first base station, the transmit beam of the second base station determined by the second base station based on the transmitted beam report. Some examples of the method, apparatuses, and non-transitory computer-readable medium described herein may further include operations, features, means, or instructions for completing the RACH procedure to transition to dual connectivity operation with both the first base station and the second base station.

A method of wireless communication at a first base station is described. The method may include identifying that a UE connected with the first base station is to perform a RACH procedure for the UE to establish a second connection with a second base station and transmitting, to the UE, an indication that the second base station will transmit a reference signal in repetition on a transmit beam during the RACH procedure with the UE.

An apparatus for wireless communication at a first base station is described. The apparatus may include a processor, memory in electronic communication with the processor, and instructions stored in the memory. The instructions may be executable by the processor to cause the apparatus to identify that a UE connected with the first base station is to perform a RACH procedure for the UE to establish a second connection with a second base station and transmit, to the UE, an indication that the second base station will transmit a reference signal in repetition on a transmit beam during the RACH procedure with the UE.

Another apparatus for wireless communication at a first base station is described. The apparatus may include means for identifying that a UE connected with the first base station is to perform a RACH procedure for the UE to establish a second connection with a second base station and transmitting, to the UE, an indication that the second base station will transmit a reference signal in repetition on a transmit beam during the RACH procedure with the UE.

A non-transitory computer-readable medium storing code for wireless communication at a first base station is described. The code may include instructions executable by a processor to identify that a UE connected with the first base station is to perform a RACH procedure for the UE to establish a second connection with a second base station and transmit, to the UE, an indication that the second base station will transmit a reference signal in repetition on a transmit beam during the RACH procedure with the UE.

Some examples of the method, apparatuses, and non-transitory computer-readable medium described herein may further include operations, features, means, or instructions for transmitting, to the UE, an indication of a number of repetitions for the reference signal. Some examples of the method, apparatuses, and non-transitory computer-readable medium described herein may further include operations, features, means, or instructions for transmitting, to the second base station, an indication of a number of repetitions for the reference signal. Some examples of the method, apparatuses, and non-transitory computer-readable medium described herein may further include operations, features, means, or instructions for transmitting, to the UE, an indication of the transmit beam to be used by the second base station to transmit the reference signal in repetition. Some examples of the method, apparatuses, and non-transitory computer-readable medium described herein may further include operations, features, means, or instructions for receiving a beam report from the UE and determining the transmit beam based on the received beam report.

In some examples of the method, apparatuses, and non-transitory computer-readable medium described herein, the reference signal includes a CSI-RS. In some examples of the method, apparatuses, and non-transitory computer-readable medium described herein, the reference signal includes at least a portion of a SSB. Some examples of the method, apparatuses, and non-transitory computer-readable medium described herein may further include operations, features, means, or instructions for transmitting an indication of a SSB transmission mode for the SSB. Some examples of the method, apparatuses, and non-transitory computer-readable medium described herein may further include operations, features, means, or instructions for transmitting an indication of a quasi co-location relationship between the SSB and a synchronization raster SSB. In some examples of the method, apparatuses, and non-transitory computer-readable medium described herein, the indication may be transmitted in radio resource control signaling.

A method of wireless communication is described. The method may include receiving, from a first base station at a second base station, an indication that a UE connected to the first base station is to perform a RACH procedure for the UE to establish a second connection with the second base station. The method may further include identifying a transmit beam to use to transmit a reference signal to the UE in response to the received indication, and transmitting the reference signal in repetition on the transmit beam.

An apparatus for wireless communication is described. The apparatus may include a processor, memory in electronic communication with the processor, and instructions stored in the memory. The instructions may be executable by the processor to cause the apparatus to receive, from a first base station at a second base station, an indication that a UE connected to the first base station is to perform a RACH procedure for the UE to establish a second connection with the second base station. The instructions may be executable by the processor to further cause the apparatus to identify a transmit beam to use to transmit a reference signal to the UE in response to the received indication, and transmit the reference signal in repetition on the transmit beam.

Another apparatus for wireless communication is described. The apparatus may include means for receiving, from a first base station at a second base station, an indication that a UE connected to the first base station is to perform a RACH procedure for the UE to establish a second connection with the second base station. The apparatus may further include means for identifying a transmit beam to use to transmit a reference signal to the UE in response to the received indication, and means for transmitting the reference signal in repetition on the transmit beam.

A non-transitory computer-readable medium storing code for wireless communication is described. The code may include instructions executable by a processor to receive, from a first base station at a second base station, an indication that a UE connected to the first base station is to perform a RACH procedure for the UE to establish a second connection with the second base station. The code may further include instructions executable by a processor to identify a transmit beam to use to transmit a reference signal to the UE in response to the received indication, and transmit the reference signal in repetition on the transmit beam.

Some examples of the method, apparatuses, and non-transitory computer-readable medium described herein may further include operations, features, means, or instructions for receiving, from the first base station, an indication of the transmit beam that the second base station may be to use to transmit the reference signal. Some examples of the method, apparatuses, and non-transitory computer-readable medium described herein may further include operations, features, means, or instructions for identifying a number of repetitions to use to transmit the reference signal. In some examples of the method, apparatuses, and non-transitory computer-readable medium described herein, identifying the number of repetitions may include operations, features, means, or instructions for receiving, from the first base station, an indication of the number of repetitions and identifying the number of repetitions based on the received indication.

Some examples of the method, apparatuses, and non-transitory computer-readable medium described herein may further include operations, features, means, or instructions for receiving a RACH transmission from the UE in response to the transmitted reference signal. In some examples of the method, apparatuses, and non-transitory computer-readable medium described herein, the reference signal includes a CSI-RS. In some examples of the method, apparatuses, and non-transitory computer-readable medium described herein, the reference signal includes at least a portion of a SSB.

DETAILED DESCRIPTION

Figure 1:
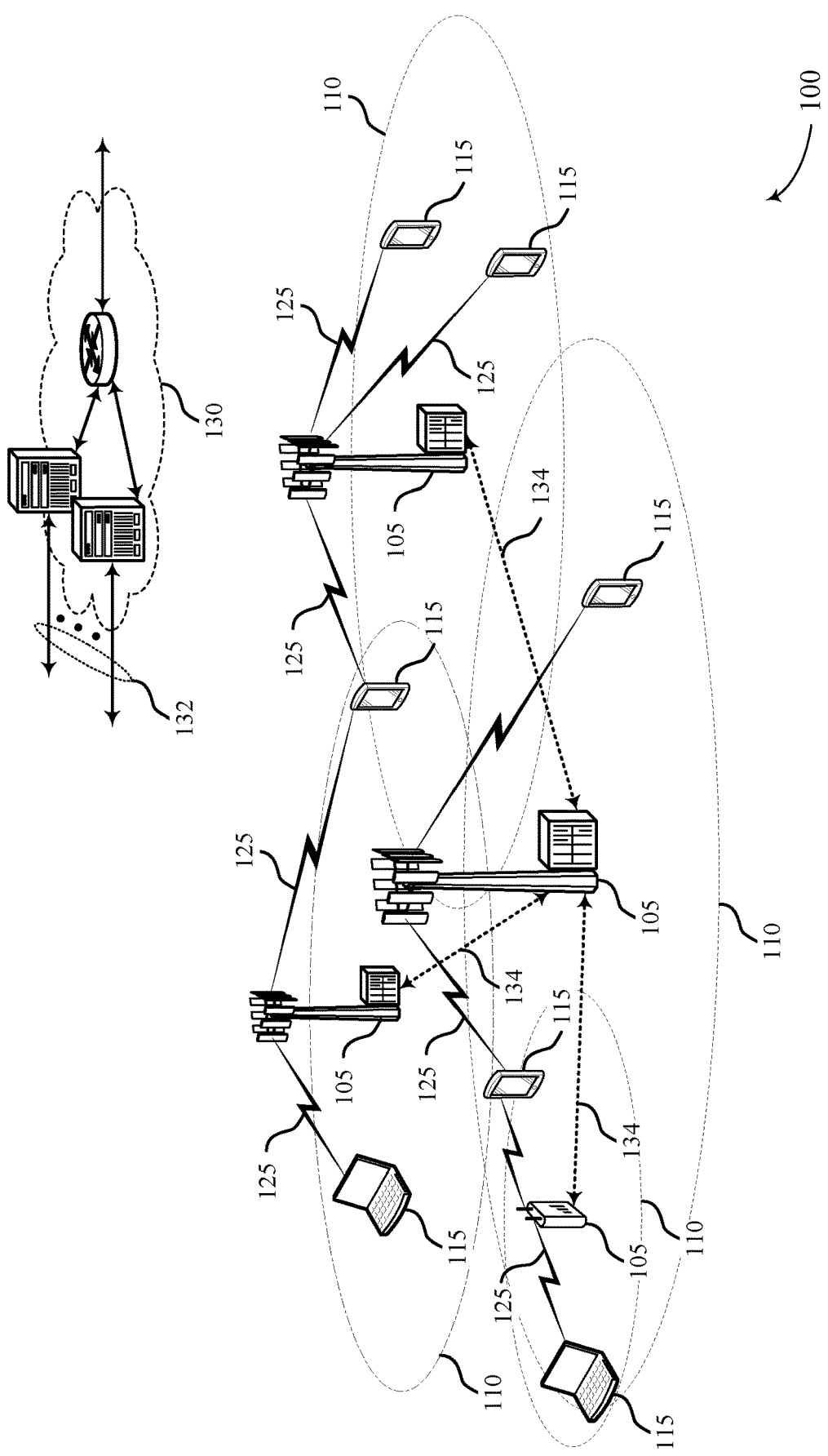
FIG. 1 illustrates an example of a system for wireless communications that supports reference signal repetition signaling in dual connected case in accordance with aspects of the present disclosure.

A dual connectivity connection may be established between a user equipment (UE) and two network nodes of a network, the network nodes using the same or two different radio access technologies (RATs) for communication. Such a dual connectivity connection may be, for example, a dual connectivity connection in which a master carrier group (MCG) uses a long term evolution (LTE) RAT and a secondary carrier group (SCG) uses a New Radio (NR) RAT. To connect with the secondary network node, a UE may perform a random access channel (RACH) procedure (e.g., with a second base station providing a second connection to the network, where the second connection may be associated with a second RAT such as an NR RAT). In cases where the secondary network uses beamformed transmissions, a UE may perform a beam selection and/or refinement procedure to select a beam direction for communicating with the secondary network node by selecting the strongest beam base on a number of reference signals transmitted directionally by the base station (e.g., by the secondary network node). The base station and UE may try several possible beam pair combinations (e.g., in which the base station may use a series of transmit beams and the UE may use a series of receive beams). Such procedures may be time consuming, and increase latency associated with attaching to the secondary network.

According to the techniques described herein, the master network node may assist or facilitate UE RACH procedures into secondary network nodes via communications between the master node (e.g., an LTE or NR base station) and the secondary node (e.g., a NR base station). For example, to expedite the secondary connection establishment procedure for a dual connectivity connection, the master node may configure or establish secondary node reference signal repetitions (e.g., repetitions of reference signal transmissions on a particular transmit beam). The master node may indicate, to the UE or both the UE and the secondary node, a number of repetitions to be used for the reference signal repetitions over the transmit beam. In some cases, the master node may further indicate the transmit beam to be used by the secondary node for the reference signal repetitions, where the master node may identify the transmit beam based on a beam report received from the UE.

Accordingly, the secondary node may transmit the reference signal repetitions to the UE on the selected transmit beam. The repeated reference signals may be a repeated channel state information reference signal (CSI-RS) (e.g., for contention-free RACH procedures), a repeated synchronization signal block (SSB) or a repeated portion of a SSB (e.g., for contention-based RACH procedures), etc. The UE may receive one or more instances of the repeated reference signal, and may identify a preferred receive beam based on the received reference signal. For example, the UE may perform a receive beam sweep procedure during the reference signal repetitions, and may identify a preferred receive beam based on the signal strength or power associated with the reference signal received using the various receive beams of the beam sweep.

Beneficially, these techniques may reduce delays and expedite connection establishment during RACH procedures (e.g., especially in scenarios where the secondary network node utilizes beamforming or directional transmissions). Backhaul links between a master node and a secondary node (e.g., a secondary node associated with a dual connectivity connection to be established) may be leveraged to exchange such reference signal repetition information (e.g., a number of reference signal repetitions, a transmit beam for reference signal repetitions, etc.). The backhaul link may be a direct backhaul (e.g., X2 connection) or indirect through a core network node (e.g., via a RNC). For example, the master node may be aware of the UEs general location (e.g., as a connection to the master network may already be established) as well as the location of the secondary node. Further, the master node may identify which transmit beams (e.g., of the secondary node) are preferable based on layer 3 (L3) beam reports received from the UE. As such, the master node may indicate transmit beam information to the secondary node for the repeated reference signals to be used for the secondary RACH procedure. Such may facilitate RACH procedures with the secondary network node, as the secondary node may have the information of a suitable transmit beam prior to transmitting reference signals for the UE, and the UE may more efficiently determine a preferred receive beam (e.g., rather than the UE and secondary node needing to establish a suitable beam pair using full circle beam sweep procedures).

Aspects of the disclosure are initially described in the context of a wireless communications system. Example process flows for implementing the discussed techniques are then described. Aspects of the disclosure are further illustrated by and described with reference to apparatus diagrams, system diagrams, and flowcharts that relate to signaling support of reference signal repetition in dual connected case.

FIG. 1 illustrates an example of a wireless communications system 100 that supports time division duplexing techniques for dual connectivity to different radio access networks in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, one or more base station 105 may provide connectivity to a first RAT (e.g., LTE connectivity), and one or more base stations 105 may provide connectivity to a second RAT (e.g., an NR RAT). A UE 115 may connect in a dual connectivity mode to both RATs and may communicate using the different RATs in accordance with various techniques as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels.

The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, one or more base station 105 may provide connectivity to a first RAT, such as an LTE RAT, and one or more base stations 105 may provide connectivity to a second RAT, such as an NR RAT. In such cases, a dual connectivity connection may be established between a UE 115 and the first and second RAT (e.g., which generally may be two same RATs or two different RATs). In some cases, the dual connectivity connection between a UE 115 and the first and second RAT may be referred to as a dual connectivity connection between a UE 115 and a first network (e.g., such as an LTE network) and a second network (e.g., such as an NR network). Such a dual connectivity connection may be, for example, a dual connectivity connection in which the first RAT (e.g., LTE) provides a MCG and the second RAT (e.g., NR) provides a SCG. Such a dual connectivity configuration with an LTE MCG and a NR SCG may be referred to as EN-DC. In some cases the MCG may use a first component carrier, or first set of component carriers, while the SCG may use a second component carrier, or second set of component carriers. In other cases, the MCG and the SCG may share resources of one or more of the same component carriers. In some cases, due to more limited coverage areas in some NR deployments, an LTE connection may be established for initial system access for a UE 115, and then NR configured such that NR communications may be a utilized when the UE 115 is in a service area of a NR cell.

A primary or master network node may facilitate UE 115 RACH procedures to establish connections to secondary network nodes for dual connectivity. A master node may identify a connected UE 115 is to perform a RACH procedure for connection with a secondary network node. The master node may then identify a transmit beam for the secondary node to use for reference signal repetitions based on a beam report received from the UE 115. The master node may transmit an indication of the repetition (e.g., which may include a number of repetitions and a transmit beam to be used for the reference signals of the RACH procedure) to both the UE 115 and the secondary node. The UE 115 may perform a receive beam sweep procedure while the secondary node transmits the reference signal repetitions on the transmit beam to identify a preferred receive beam, and may then complete the RACH procedure for connection to the secondary network node.

RACH procedures may include multiple RACH messages transmitted between the UE 115 and base station 105 to establish network communications. The UE 115 may transmit a first RACH message (e.g., RACH message 1) that includes a RACH preamble, and the base station 105 may transmit a second RACH message (e.g., RACH message 2) that includes a random access response to provide the UE 115 with an uplink resource grant, a timing advance, and a temporary cell radio network temporary identity (C-RNTI). The UE 115 may then transmit a third RACH message (e.g., RACH message 3) that includes a radio resource control (RRC) connection request. The base station 105 may respond with a fourth RACH message (i.e., RACH message 4) that includes a contention resolution message to proceed with the RRC setup.

The described techniques may reduce delays and expedite connection establishment during RACH procedures (e.g., especially in scenarios where the secondary network node utilizes beamforming or directional transmissions). Backhaul links between a master node and a secondary node (e.g., a secondary node associated with a dual connectivity connection to be established) may be leveraged to exchange such reference signal repetition information (e.g., a number of reference signal repetitions, a transmit beam for reference signal repetitions, etc.) and facilitate more efficient connection establishment between a UE 115 and the secondary node. For example, the master node may be aware of the UEs general location (e.g., as a connection to the master network may already be established) as well as the location of the secondary node. Further, the master node may identify which transmit beams (e.g., of the secondary node) are preferable for the UE based on, for example, L3 beam reports received from the UE. As such, the master node may indicate transmit beam information to the secondary node for the repeated reference signals to be used for the secondary RACH procedure. Such indication may facilitate RACH procedures with the secondary network node, as the secondary node may have the information of a suitable transmit beam prior to transmitting reference signals for the UE, and the UE may more efficiently determine a preferred receive beam (e.g., rather than the UE and secondary node needing to establish a suitable beam pair using full circle beam sweep procedures).

Figure 2:
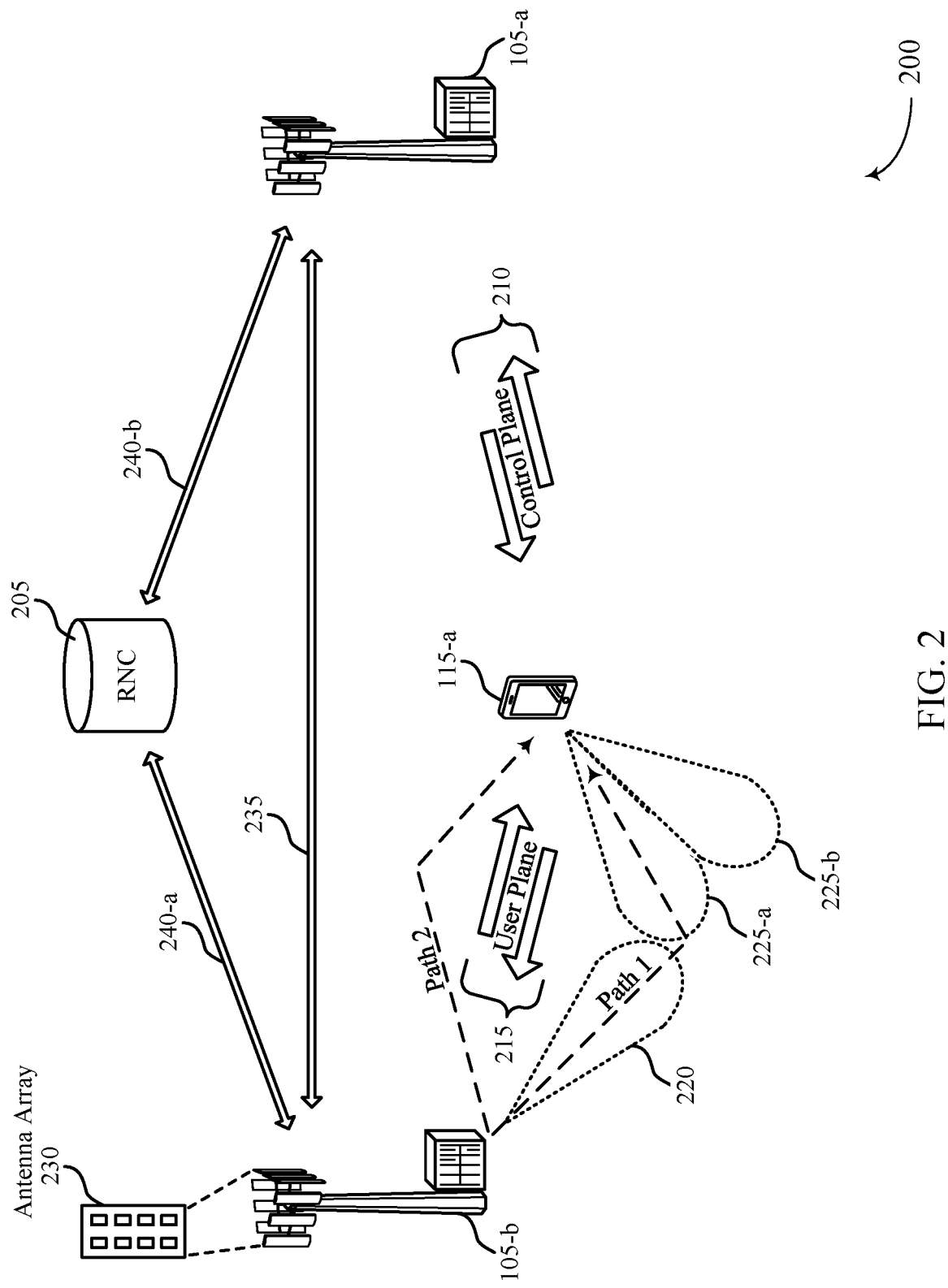
FIG. 2 illustrates an example of a wireless communications system that supports reference signal repetition signaling in dual connected case in accordance with aspects of the present disclosure.

FIG. 2 illustrates an example of a wireless communications system 200 that supports reference signal repetition signaling in dual connected case in accordance with aspects of the present disclosure. In some examples, wireless communications system 200 may implement aspects of wireless communications system 100. Wireless communications system 200 includes UE 115-*a*, base station 105-*a*, and base station 105-*b*, which may be examples of UEs 115 and base stations 105 as described with reference to FIG. 1. Wireless communications system 200 may illustrate UE 115-*a* performing a RACH procedure with a secondary network node for dual connectivity via reference signal repetition. For example, base station 105-*b* may be a secondary node, and may communicate with a master node (e.g., base station 105-*a*) for coordination of reference signal repetition for RACH procedure with UE 115-*a*. In some cases, base station 105-*a* and base station 105-*b* may be associated with a same RAT (e.g., NR-NR dual connectivity). In other examples, base station 105-*a* and base station 105-*b* may be associated with different RATs (e.g., LTE-NR dual connectivity).

In some cases, a dual connectivity connection may be established between a UE and two network nodes. Such a dual connectivity connection may be, for example, a dual connectivity connection in which a MCG is associated with a LTE RAT and a SCG is associated with a NR RAT. In other examples, the dual connectivity connection may be a dual connectivity connection in which both the MCG and SCG are NR RATs. In a dual connectivity configuration, UE 115-*a* may be connected to the two network nodes (e.g., to base stations 105-*a* and 105-*b*). As discussed above, in the control plane 210, the RRC protocol layer may provide establishment, configuration, and maintenance of an RRC connection between a UE 115-*a* and a base station 105-*a* or core network. In dual connectivity cases, UE 115-*a* may further establish a connection with a secondary network node supporting radio bearers for user plane data (e.g., in the user plane 215). In some cases, each of base station 105-*a* and 105-*b* may be connected to a radio network controller 205 via links 240-*a* and 240-*b*, respectively.

Some wireless communication systems may support beamformed transmissions between a base station and a UE. For example, some systems may operate in mmW frequency ranges (e.g., such as 28 GHz, 40 GHz, 60 GHz). Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A wireless device may use a number of antenna ports (e.g., 1, 2, 4, 8 antenna ports) associated with antennas array 230 to form beams in various directions using a number of analog weighting factors.

For example, base station 105-b (e.g., a secondary node associated with a NR RAT) may transmit downlink signals using directional beams or transmit beams 220, a UE 115 may also utilize beamforming for the UE's own directional receive beams 225 (e.g., and may also utilize beamforming for the UE's own uplink transmit beams for uplink transmissions to the base station). Accordingly, when attempting to access a network when the UE 115-a has data to communicate, the UE 115-a and base station 105-b may use beamforming techniques for RACH transmissions. In such cases, base station 105-b may transmit downlink reference signals to UE 115-a using a transmit beam 220 in a particular direction, and the UE 115-a may in turn receive the reference signal on a receive beam 225. As such, there may be several paths (e.g., 'Path 1' and 'Path 2') or beam pairs that may be suitable for successful communication using beamforming. However, there may also be several paths not suitable for communications.

In some cases, UEs (e.g., such as UE 115-a) may be capable of dual-connectivity connections to improve data throughput, where the secondary network node may utilize beamforming (e.g., the secondary connection may be to a NR RAT). In order to connect to the secondary network node (e.g., in order for UE 115-a to connect to base station 105-b) a RACH procedure may be performed. The primary network node may (e.g., if NR) or may not (e.g., if LTE) use beamforming. However, in such cases where the base station 105-b utilizes directional transmissions, a suitable beam pair may need to be established in order to perform or complete the connection establishment procedure. As prior to connection the base station 105-b and UE 115-a may have little to no knowledge of each other's location, preferred beams, etc., the base station 105-b and UE 115-a may need to perform beam sweeping procedures and communicate reference signals in order to determine necessary beam information for completing connection establishment. As discussed above, these beam sweeping procedures may be associated with undesirable latency as the base station 105-b may sweep several transmit beams 220 and the UE 115-a may sweep several receive beams 225 in order to identify a suitable beam pair for communications. That is, for network nodes utilizing beamformed or directional transmissions, the base station 105-b and UE 115-a may try several possible beam pair combinations using periodic synch signals (e.g., as SSBs) broadcasted by the base station 105-b. Such beam sweeping procedures may be time consuming, and may increase latency associated with attaching to the secondary network node.

The techniques described herein provide for improved RACH procedures for connecting to secondary network nodes for dual connectivity. For example, UE 115-a may be connected to a primary network node or master network node (e.g., such as base station 105-a) and may perform a RACH procedure to connect to a secondary network node (e.g., such as base station 105-b) for dual connectivity. The master network node (e.g., base station 105-a) may facilitate or expedite UE 115-a connection to the secondary network node via reference signal repetition signaling described herein. For example, the master node (e.g., base station 105-a) may configure or establish secondary node (e.g., base station 105-b) reference signal repetitions. Reference signal repetitions may refer to repetitions of a reference signal (e.g., CSI-RS, SSB or portions of SSBs, or other suitable reference signals, etc.) transmitted at least once on a particular transmit beam 220. For example, reference signal repetitions may refer to a reference signal (e.g., a CSI-RS, an SSB or a portions of an SSB, or other suitable reference signals, etc.) transmitted two or more times (e.g., according to some number of repetitions) on the same transmit beam (e.g., where the number of repetitions corresponds to a number of symbols, a number of slots, or some other pattern over which the reference signals are transmitted in repetition). The base station 105-a may indicate, to the UE 115-a or to both the UE 115-a and the base station 105-b, a number of repetitions to be used for the reference signal repetitions over the transmit beam 220. In some cases, the base station 105-a may further indicate the transmit beam 220 to be used by the base station 105-b for the reference signal repetitions, where the base station 105-a may identify the transmit beam 220 based on a beam report received from the UE 115-a.

Accordingly, the base station 105-b may transmit the reference signal repetitions to the UE 115-a on the selected transmit beam 220. The repeated reference signals may include a repeated CSI-RS (e.g., for contention-free RACH procedures), a repeated SSB or a repeated portion of a SSB (e.g., for contention-based RACH procedures), etc. The UE 115-a may receive the repeated reference signal, and may identify a preferred receive beam (e.g., receive beam 225-a) based on the reference signal repetitions. For example, the UE may perform a receive beam sweep procedure during the reference signal repetitions, and may identify a preferred receive beam 225-a based on the strength of each reference signal repetition received using the various receive beams 225. That is, UE 115-a may monitor for a reference signal using receive beam 225-a, then may monitor for a reference signal using receive beam 225-b, and so on, across two or more receive beams. The UE 115-a may then identify that the reference signal repetition received using beam 225-a was received with, for example, the greatest signal strength, and may identify receive beam 225-a as the preferred receive beam.

As such, the wireless communications system 200 may leverage the connection between base station 105-a and base station 105-b (e.g., link 235) to exchange information facilitating a faster connection between the UE 115-a and the secondary network node. In some cases, link 235 may refer to a backhaul link. In some cases, base station 105-a and base station 105-b may be connected through one or more intermediary nodes (e.g., and link 235 may refer to the link or connection between the one or more intermediary nodes). Base station 105-a may use information from connected UE 115-a to assist with UE 115-a connection to base station 105-b. For example, base station 105-a may be able to determine or estimate which base station 105-b transmit beams 220 are preferable for the RACH procedure between UE 115-a and base station 105-b. The base station 105-a may be able to determine or estimate these beams based on beam reports received from the UE 115-a, based on base station 105-a knowledge of the location of UE 115-a, etc. The base station 105-a may then indicate the identified transmit beam 220 and a number of repetitions for the base station 105-b reference signal transmission to the base station 105-b and the UE 115-a.

Base station 105-b may then transmit the reference signal repetitions (e.g., according to the number identified by either the base station 105-a or base station 105-b itself) on the transmit beam identified by base station 105-a. Examples of the reference signal repeated may include CSI-RS, demodulation reference signals (DMRSs)), cell specific reference signal (CRS), beam refinement reference signal, all or a portion of SSBs, etc. In some cases, a number of repetitions may not be specified, and the base station 105-b may repeat the reference signal until a RRC message is received from base station 105-a indicating base station 105-b may stop transmitting the repetitions (e.g., base station 105-b may repeat reference signals on the transmit beam 220 until a SgNB Reconfig Complete message is received from base station 105-a, indicating that UE 115-a has identified a receive beam).

The UE 115-a may attempt to receive the reference signals via receive beams 225, which may be configured using different beamforming parameters at receive circuitry at the UE 115-a. The UE 115-a may identify a particular receive beam 225 (e.g., receive beam 225-a) associated with a particular reference signal repetition that provides relatively favorable performance (e.g., that has a best channel quality of the different measured reference signal repetitions over the different receive beams 225). In some cases, the UE 115-a may transmit an indication of which receive beam 225 is identified at the UE 115-a as a preferred beam. The UE 115-a may thus attain and maintain a beam pair link (BPL) with the base station 105-b, which may be further refined and maintained in accordance with one or more established beam refinement procedures.

In some cases, a reference signal may be associated with a SSB. A particular SSB may have an associated transmission configuration indication (TCI) state. The base station 105-a or base station 105-b may, in some cases, indicate a downlink transmission beam 220 based on antenna ports quasi co-location (QCL) information that may be indicated by a TCI state. A TCI state may be associated with one downlink reference signal set (e.g., a SSB and aperiodic, periodic, or semi-persistent CSI-RS) for different QCL types (e.g., QCL types for different combinations of Doppler shift, Doppler spread, average delay, delay spread, or spatial receive parameters). In cases where the QCL type indicates spatial receive parameters, it may correspond to analog receive beamforming parameters of a receive beam 225 at the UE 115-a. Thus, by the base station 105-a or base station 105-b indicating a transmit beam 220 via a TCI indication, the UE 115-a may select a corresponding receive beam 225 from its BPLs.

Base station 105-b may include or be associated with an antenna array, such as a large antenna array 230 (e.g., 16×4, 32×4, 32×8, 64×4, 64×8, 128×16, etc.). Such a large antenna array 230 may give the base station 105-b the ability to focus a tight or narrow beam (e.g., a beam with a narrow angular beamwidth) on the UE 115-a. As the widths of beams decrease due to larger antenna arrays 230, the techniques described herein may result in more latency reduction (e.g., as the narrower the beam, the more beam directions may otherwise have needed to be swept for reference signals). Base station 105-b radio frequency (RF) hardware may combine a signal with analog beamforming (e.g., antenna weighting) to produce such beam formed signals. In some cases, UEs (e.g., UE 115-a) may also include antenna arrays 230 for beam forming operations.

UE 115-a may establish a dual connectivity connection utilizing a secondary network node that utilizes beamforming (e.g., such as a NR RAT) for access to larger bandwidth for data communications (e.g., in the user plane 215). That is, dual connectivity (e.g., both LTE-NR and NR-NR dual connectivity) may be used to expand network coverage and increase throughput. A UE 115-b may connect to both LTE and NR, and may use LTE for network control (e.g., for control plane 210) and leverage the NR network for high throughput user data transmission (e.g., for user plane 215). A UE 115-a may first RACH to base station 105-a (e.g., an LTE network node) and establish a master connection. The UE 115-a may then RACH to NR to make a secondary connection using the improved connection establishment procedures described herein. RACH procedures may be used in NR to figure out which beams to use for both the base station and the UE. RACH procedures may further be used to obtain relevant system information from the base station and the UE, as well as to obtain timing information.

In some cases, base station 105-a may signal support for SSB repetition for SSB based RACH. Base station 105-a may measure which of base station 105-b beams is preferable for the UE 115-a. The base station 105-a may indicate, to base station 105-b, which transmit beam 220 is preferred by the UE 115-a, and the base station 105-b may transmit SSB on the preferred beam for the UE 115-a. The base station 105-a may then indicate to the UE 115-a that multiple SSBs will be transmitted by base station 105-b using the same beam (e.g., and the base station 105-a may indicate, to the UE 115-a, which transmit beam 220 may be used by the base station 105-b for the multiple SSBs). As such, base station 105-b may not need to broadcast SSB in multiple beams for the base station 105-b and UE 115-a to try all beam pair combinations (e.g., and therefore may reduce RACH latency). In some cases, NR systems may include a synchronization raster (which, in some cases, may be referred to as a synch raster, a synchronization signal raster, etc.) that may designate potential positions where the UE may receive and decode a synchronization signal (e.g., SSB). Such potential positions may or may not necessarily coincide with the center frequency of a given channel or a physical resource block (PRB) grid of the channel (e.g., in some cases a field of the PBCH may indicate a frequency offset between the common PRB and the synch signal raster where SSBs may be found). In some examples, there may be two modes of multiple SSB transmission on the same transmit beam 220. For mode 1, on synch raster SSB (e.g., where the SSB is associated with a frequency defined by some configured synchronization raster) may be transmitted on the same beam. For mode 2, UE specific off raster SSB (e.g., where the SSB is associated with different frequency than the frequency defined by some configured synchronization raster) may be transmitted on the same beam. In some cases, RRC may indicate which mode the base station 105-b is operating. RRC signaling may also indicate if and how synch raster SSB may share the same QCL as repeated SSB.

In some cases, base station 105-a may signal support for CSI-RS repetition for CSI-RS based RACH. Base station 105-a may measure which base station 105-b beam is preferable for the UE 115-a. The base station 105-a may indicate the preferred beam to the base station 105-b, and the base station 105-b may transmit CSI-RS for CSI-RS based RACH on the preferable beam for the UE 115-a. The base station 105-a may indicate to the UE 115-a that multiple CSI-RS will be transmitted on the same beam by base station 105-b. RRC signaling may indicate CSI-RS repetition on the same transmit beam 220 for CSI-RS based RACH.

Figure 3:
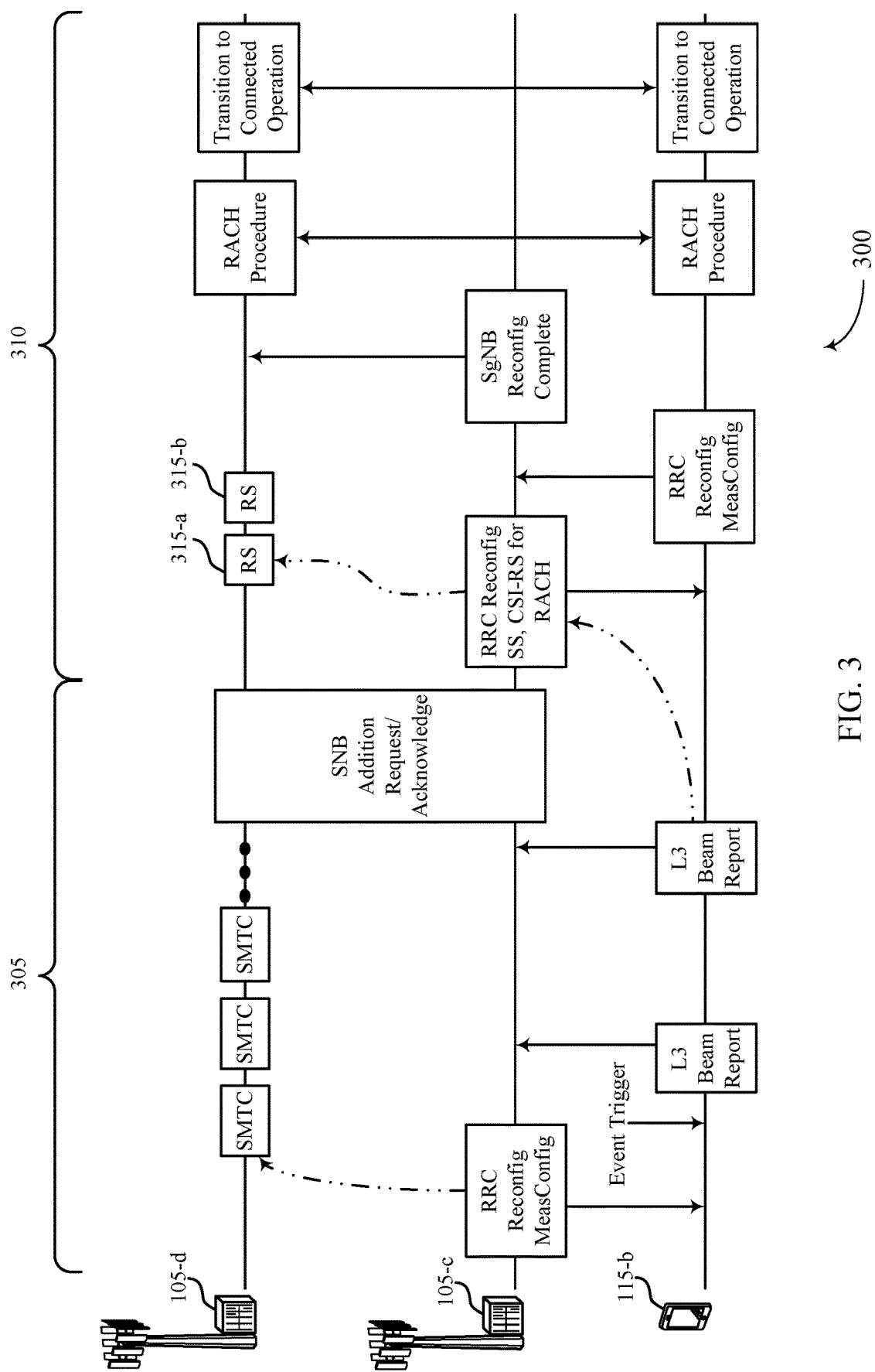
FIGS. 3 and 4 illustrate example process flows that support reference signal repetition signaling in dual connected case in accordance with aspects of the present disclosure.

FIG. 3 illustrates an example of a process flow 300 that supports reference signal repetition signaling in dual connected case in accordance with aspects of the present disclosure. In some examples, process flow 300 may implement aspects of wireless communications system 100 and wireless communications system 200. Process flow 300 includes UE 115-b, base station 105-c, and base station 105-d, which may be examples of a UE 115 and base stations 105 as described with reference to FIGS. 1-2. Process flow 300 may illustrate a master node (e.g., base station 105-*c*) establishing reference signal repetition for a RACH procedure between UE 115-*b* and a secondary node (e.g., base station 105-*d*) for a secondary network node connection establishment (e.g., for a dual connectivity connection). In the following description of the process flow 300, the operations between the UE 115-*b*, the base station 105-*c*, and the base station 105-*d* may be transmitted in a different order than the exemplary order shown, or the operations performed by UE 115-*b*, base station 105-*c*, and base station 105-*d* may be performed in different orders or at different times. In some cases, certain operations may also be left out of the process flow 300, or other operations may be added to the process flow 300.

For example, UE 115-*b* may already be attached to base station 105-*c* (e.g., UE 115-*b* may have an established connection with the master network node). The base station 105-*c* may provide the connection to the master network node, which may be, for example, associated with a LTE RAT or a NR RAT. UE 115-*b* may desire to connect to or RACH to a secondary network node through base station 105-*d*. Base station 105-*c* may facilitate or assist the UE connection establishment procedure with base station 105-*d* according to the techniques described herein.

For example, in duration 305, base station 105-*c* may tell UE 115-*b* and base station 105-*d* (e.g., the secondary network node) to measure beam pairs. Base station 105-*c* may send an indication (e.g., RRC Reconfig MeasConfig), to UE 115-*b* and base station 105-*d*, to perform coordinated beam direction testing to figure out which beams are candidates for further refinement and enhancement (e.g., to figure out the quality of the link associated with different beam directions). For example, during SSB measurement timing configuration (SMTC) windows, the base station 105-*d* may transmit SSB/CSI-RS on multiple beams for UE 115-*b* to measure. The UE 115-*b* may transmit beam measurement reports (e.g., L3 beam reports) to the base station 105-*c*, which may allow for base station 105-*c* to estimate good beams for the base station 105-*d* to transmit the reference signal repetitions on. For example, the L3 beam report may include beam quality measurements of different beams from the base station 105-*d*. The base station 105-*c* may perform some calculation to determine a transmit beam (e.g., or group beam direction) based on the beam report, and may share that information with the base station 105-*d*.

In duration 310, base station 105-*c* may send a RRC Reconfig SS, CSI-RS for RACH message to the base station 105-*d* and the UE 115-*b*. The RRC Reconfig SS, CSI-RS for RACH message may indicate to the base station 105-*d* that UE 115-*b* will RACH to base station 105-*d* and may also indicate a transmit beam and/or number of repetitions for the reference signal repetitions, etc. The RRC Reconfig SS, CSI-RS for RACH message may indicate to the UE 115-*b* that the base station 105-*d* will transmit reference signal repetitions, such that the UE 115-*b* may then know to perform a receive beam sweep in order to identify a preferred receive beam.

The reference signal (RS) 315 may then be repeated on the transmit beam by base station 105-*d* (e.g., according to the transmit beam and/or number of repetitions indicated by base station 105-*c*). This beam repetition may support L3 mobility (e.g., vs L1 mobility as the UE 115-*b* is not connected to base station 105-*d* for L1 mobility). That is, based on L3 beam reports, base station 105-*c* may determine which base station 105-*d* beams are preferable. Using the RRC reconfiguration message (e.g., the RRC Reconfig SS, CSI-RS for RACH message), the base station 105-*c* may ask the base station 105-*d* to transmit SS/CSI-RS onto a specific transmit beam multiple times, and tells the UE 115-*b* that these SS/CSI-RS are transmitted on the same beam so that the UE 115-*b* may then try different receive beams to find its preferable receive beam.

After the UE 115-*b* identifies a preferred receive beam, the UE 115-*b* may transmit a RRC reconfiguration complete message to the base station 105-*c* indicating that UE 115-*b* has identified a receive beam. The base station 105-*c* may then transmit a SgNB Reconfig Complete message to base station 105-*d* indicating that base station 105-*d* does not need to continue sending reference signal repetitions (e.g., indicating that the reference signal/receive beam selection procedure is complete). The UE 115-*b* and base station 105-*d* may then perform the RACH procedure and the UE 115-*b* may transition to connected operation.

Figure 4:
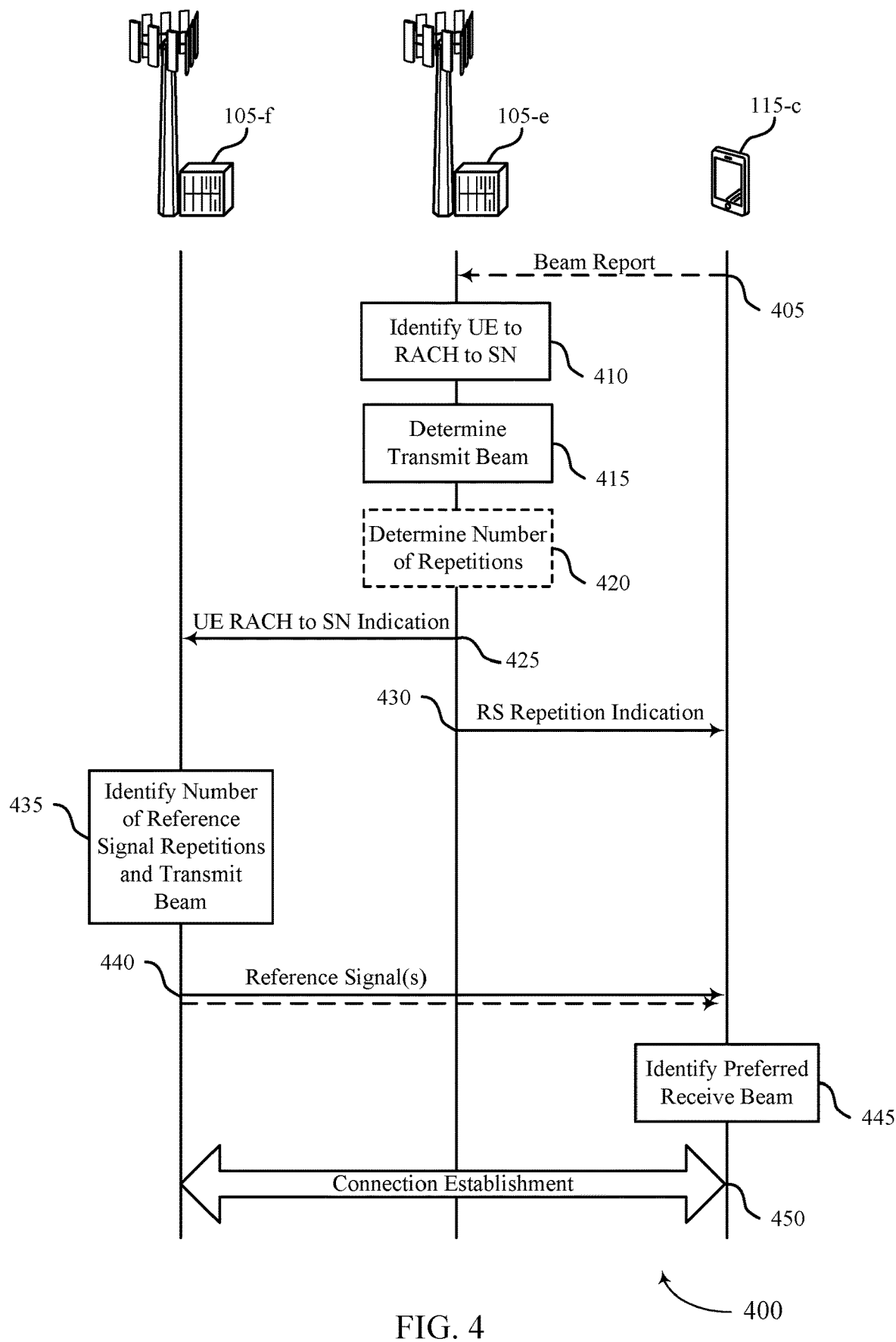

FIG. 4 illustrates an example of a process flow 400 that supports reference signal repetition signaling in dual connected case in accordance with aspects of the present disclosure. In some examples, process flow 400 may implement aspects of wireless communications system 100 and wireless communications system 200. Process flow 400 includes UE 115-*c*, base station 105-*e*, and base station 105-*f*, which may be examples of a UE 115 and base stations 105 as described with reference to FIGS. 1-3. Process flow 400 may illustrate a master node (e.g., base station 105-*e*) establishing reference signal repetition for a RACH procedure between UE 115-*c* and a secondary node (e.g., base station 105-*f*) for a secondary network node connection establishment (e.g., for a dual connectivity connection). In the following description of the process flow 400, the operations between the UE 115-*c*, the base station 105-*e*, and the base station 105-*f* may be transmitted in a different order than the exemplary order shown, or the operations performed by UE 115-*c*, base station 105-*e*, and base station 105-*f* may be performed in different orders or at different times. In some cases, certain operations may also be left out of the process flow 400, or other operations may be added to the process flow 400.

At 405, UE 115-*c* may transmit a beam report (e.g., a L3 beam report) to base station 105-*e*. UE 115-*c* may have an established connection with a primary or master network node (e.g., base station 105-*e*) and, in some cases, base station 105-*e* may be referred to as a master node.

At 410, base station 105-*e* may identify that UE 115-*c* is to perform a RACH procedure for the UE 115-*c* to establish a second connection with a second base station (e.g., with base station 105-*f*). For example, base station 105-*e* may identify UE 115-*c* is configured with, or capable of, dual connectivity configuration. In some cases, UE 115-*c* may transmit an indication of intent to establish a second connection to a secondary network node (e.g., base station 105-*f*) to base station 105-*e*. In some cases, base station 105-*e* may identify base station 105-*f* as a secondary node capable of providing a secondary connection.

At 415, base station 105-*e* may determine a transmit beam on which base station 105-*f* is to transmit reference signal repetitions based on the beam report received at 405. For example, once base station 105-*e* identifies that UE 115-*c* is to perform a RACH procedure for connection establishment to a secondary network node via base station 105-*f* (e.g., at 410), the base station 105-*e* may determine a transmit beam on which base station 105-*f* is to transmit reference signal repetitions based information received from the UE 115-*c* in a beam report. In some cases, base station 105-*e* may use an estimation of the general location of the UE 115-*c* as well as the location of the secondary node (e.g., base station 105-*f*) to determine the transmit beam.

At 420, base station 105-*e* may, in some examples, determine a number of repetitions for the reference signal to be transmitted by base station 105-*f* (e.g., in other example, base station 105-*f* may determine the number of repetitions for the reference signal). In some cases, the number of repetitions for the reference signal may be based on latency targets (e.g., system latency requirements associated with RACH procedures or latency thresholds for RACH procedures). In some cases, the number of repetitions for the reference signal may be based on information in the beam report received at 405 (e.g., if a transmit beam identified at 415 is determined to be a relatively strong beam, less repetitions may be determined).

At 425, base station 105-*e* may transmit an indication, to base station 105-*f*, that UE 115-*c* is to perform a RACH procedure for the UE 115-*c* to establish a second connection with the base station 105-*f*. For example, the indication may indicate that UE 115-*c* is connected to base station 105-*e* and intends to establish a second connection to a secondary network node via base station 105-*f*. In some cases, the indication may include a number of reference signal repetitions, or a transmit beam on which to transmit the reference signal repetitions, or both. In some cases, the indication of the number of reference signal repetitions and/or the transmit beam on which to transmit the reference signal repetitions may be transmitted as separate indications (e.g., the indication that the UE 115-*c* is to perform the RACH procedure for the UE 115-*c* to establish the second connection with the base station 105-*f* may include indication of the number of reference signal repetitions and/or the transmit beam on which to transmit the reference signal repetitions, or the base station 105-*e* may transmit separate indications of the number of reference signal repetitions and/or the transmit beam on which to transmit the reference signal repetitions). In some cases, the indication at 425 may be referred to as an indication of the repetition to be used for the reference signals of the RACH procedure (e.g., and may include the number of repetitions and/or the transmit beam).

At 430, base station 105-*e* may transmit an indication (e.g., via RRC signaling), to UE 115-*c*, that second base station 105-*f* will transmit a reference signal in repetition on a transmit beam during a RACH procedure for the UE 115-*c* to establish a second connection with the second base station 105-*f*. In some cases, the indication may include a number of reference signal repetitions, or a transmit beam on which the base station 105-*f* may transmit the reference signal repetitions, or both. In some cases, the indication of the number of reference signal repetitions and/or the transmit beam on which the base station 105-*f* may transmit the reference signal repetitions may be transmitted as separate indications (e.g., the indication that base station 105-*f* may transmit a reference signal in repetition on a transmit beam during a RACH procedure may include indication of the number of reference signal repetitions and/or the transmit beam on which the base station 105-*f* may transmit the reference signal repetitions, or the base station 105-*e* may transmit separate indications of the number of reference signal repetitions and/or the transmit beam on which the base station 105-*f* may transmit the reference signal repetitions). In some cases, the indication of 430 may be referred to as an indication of the repetition to be used for the reference signals of the RACH procedure (e.g., and may include the number of repetitions and/or the transmit beam).

At 435, base station 105-*f* may identify a number of reference signal repetitions and a transmit beam on which to transmit the reference signal repetitions for the RACH procedure with UE 115-*c*. In some cases, the number of reference signal repetitions and the transmit beam may be identified based on the indication received at 425. In some cases, the base station 105-*f* may itself determine the number of reference signal repetitions and/or the transmit beam.

At 440, base station 105-*f* may transmit the reference signal in repetition according to the identified number of reference signal repetitions and transmit beam. That is, the base station 105-*f* may transmit the reference signal on the identified transmit beam, and may repeat the reference signal transmission, using the identified transmit beam, according to the identified number of reference signal repetitions. In some cases, the reference signal may include or refer to a CSI-RS (e.g., when the RACH procedure is a contention-free RACH procedure). In some cases, the reference signal may include or refer to all or a portion of a SSB (e.g., when the RACH procedure is a contention-based RACH procedure). In cases where the repeated reference signal is an SSB, base station 105-*f* may further transmit an indication of a SSB transmission mode for the SSB (e.g., a synchronization raster SSB mode or a UE-specific off-raster mode) and a quasi co-location relationship between the SSB and a synchronization raster SSB to the UE 115-*c*.

At 445, UE 115-*c* may identify a preferred receive beam based on the one or more reference signal repetitions received at 440. For example, UE 115-*c* may sweep through one or more receive beams when monitoring for the reference signal repetitions, and may identify a preferred receive beam based on the signal strength of received reference signal repetitions (e.g., received using the different receive beams). In some cases, the preferred receive beam may be identified based on reference signal received power (RSRP) or reference signal received quality (RSRQ) characteristics associated with the different reference signal repetitions.

At 450, UE 115-*c* and base station 105-*f* may complete the RACH procedure, and UE 115-*c* may transition to dual connectivity operation with both base station 105-*e* and second base station 105-*f*. For example, UE 115-*c* may transmit, to base station 105-*f*, a response (e.g., a RACH transmission) to the repeated reference signals received at 440 and a connection may be established between the UE 115-*c* and the base station 105-*f*.

Figure 5:
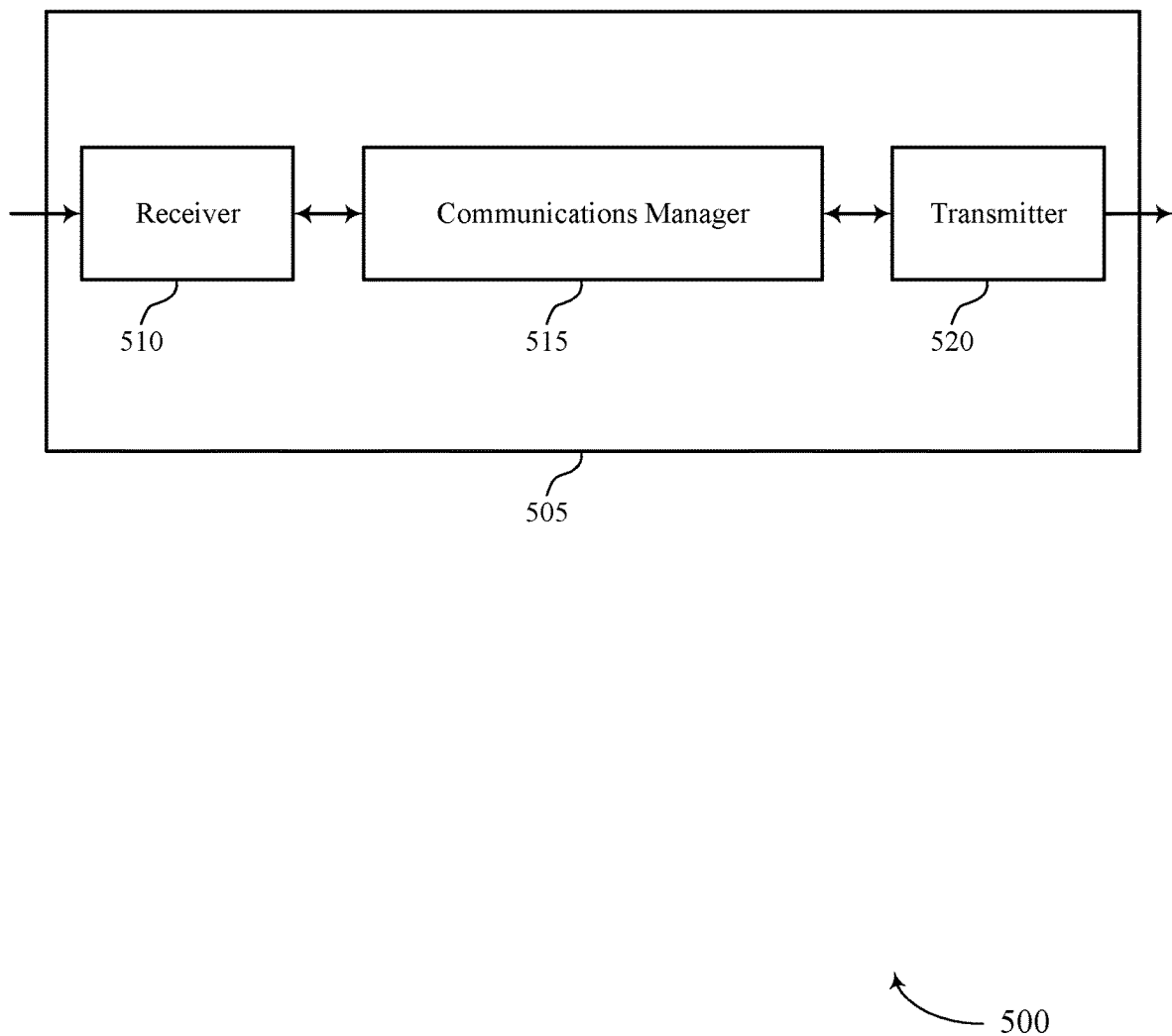
FIGS. 5 and 6 show block diagrams of devices that support reference signal repetition signaling in dual connected case in accordance with aspects of the present disclosure.

FIG. 5 shows a block diagram 500 of a device 505 that supports reference signal repetition signaling in dual connected case in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to signaling support of reference signal repetition in dual connected case, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a first base station with which the device 505 is connected, an indication that a second base station will transmit a reference signal in repetition on a transmit beam during a RACH procedure for the device 505 to establish a second connection with the second base station, receive the reference signal from the second base station during the RACH procedure according to the received indication, and identify a preferred receive beam for the device 505 based on the received reference signal. The communications manager 515 may be an example of aspects of the communications manager 810 described herein. The actions performed by the communications manager 515 as described herein may be implemented to realize one or more potential advantages discussed herein. One implementation may allow a device 505 to save power and increase battery life by avoiding having to perform lengthy RACH procedures (e.g., especially in scenarios where the second base station utilizes beamforming or directional transmissions). Additionally or alternatively, the actions performed by the communications manager 515 as described herein may provide improved quality and reliability of service at the device 505, as latency associated with RACH procedures may be reduced as the second base station may have the information of a suitable transmit beam prior to transmitting reference signals for the device 505, and the device 505 may more efficiently determine a preferred receive beam (e.g., rather than the device 505 and second base station needing to establish a suitable beam pair using full circle beam sweep procedures).

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
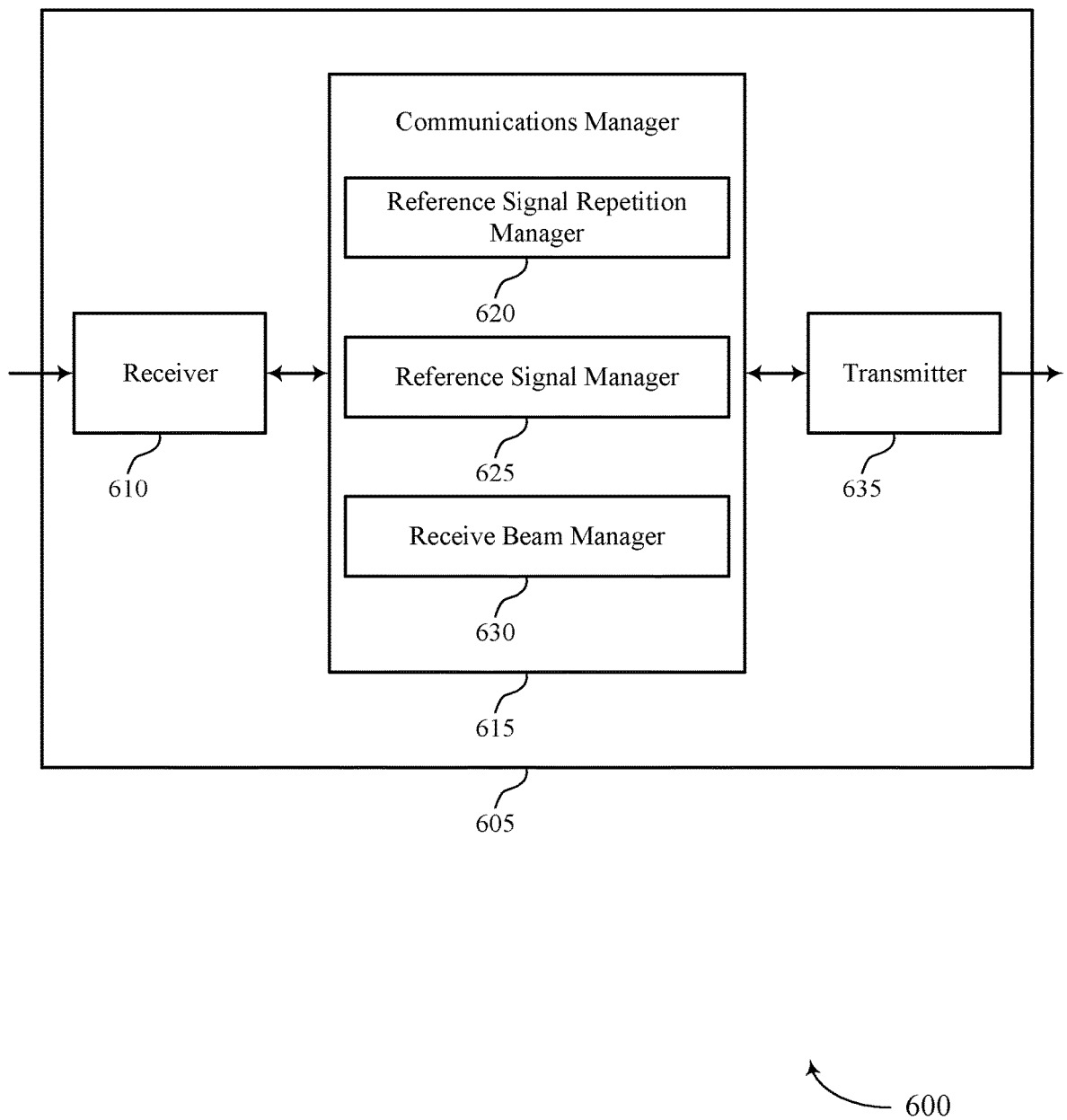

FIG. 6 shows a block diagram 600 of a device 605 that supports reference signal repetition signaling in dual connected case in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to signaling support of reference signal repetition in dual connected case, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal repetition manager 620, a reference signal manager 625, and a receive beam manager 630. The communications manager 615 may be an example of aspects of the communications manager 810 described herein.

The reference signal repetition manager 620 may receive, from a first base station with which the device 605 is connected, an indication that a second base station will transmit a reference signal in repetition on a transmit beam during a RACH procedure for the device 605 to establish a second connection with the second base station. The reference signal manager 625 may receive the reference signal from the second base station during the RACH procedure according to the received indication.

The receive beam manager 630 may identify a preferred receive beam for the device 605 based on the received reference signal.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
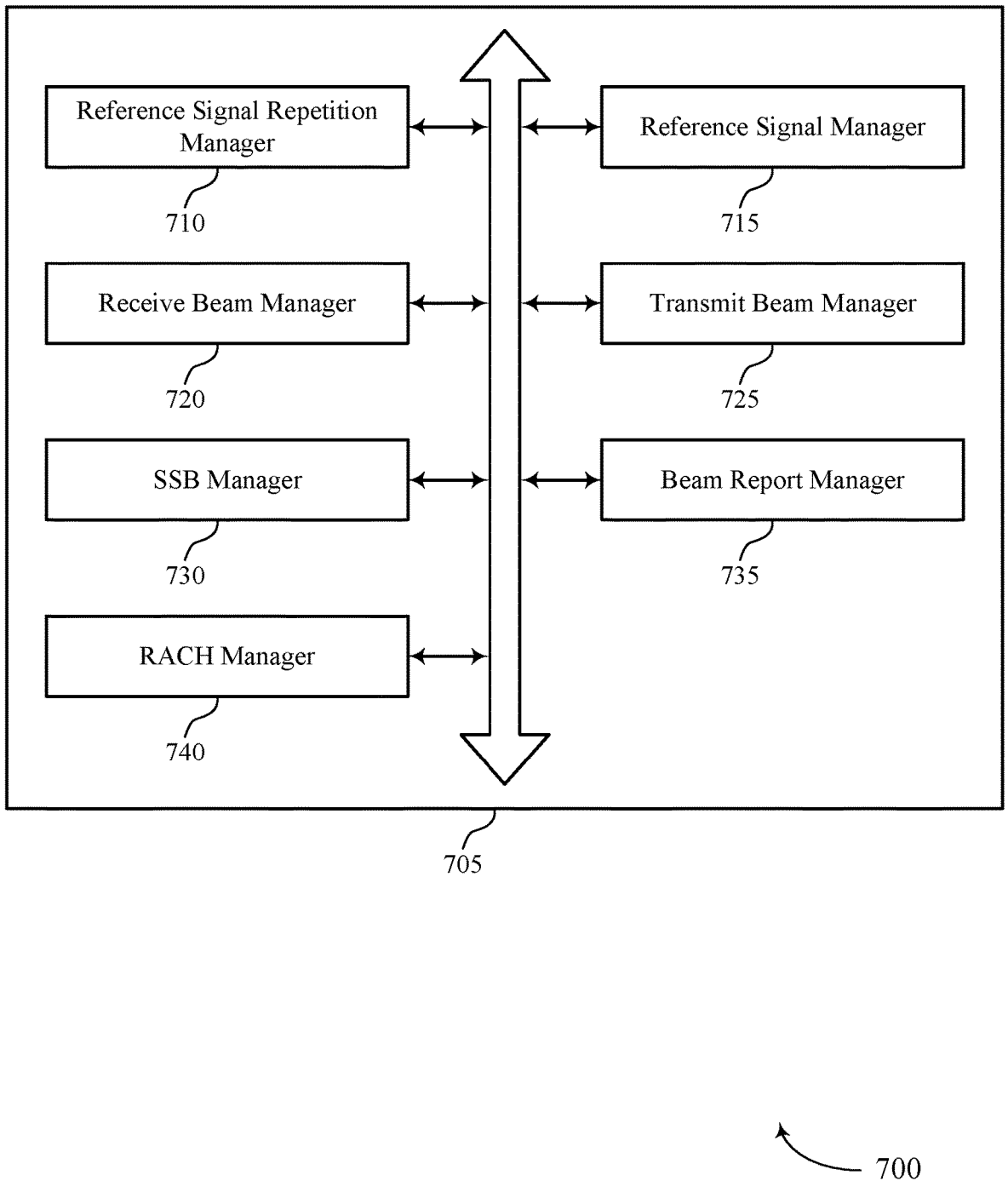
FIG. 7 shows a block diagram of a communications manager that supports reference signal repetition signaling in dual connected case in accordance with aspects of the present disclosure.

FIG. 7 shows a block diagram 700 of a communications manager 705 that supports reference signal repetition signaling in dual connected case in accordance with aspects of the present disclosure. The communications manager 705 may be an example of aspects of a communications manager 515, a communications manager 615, or a communications manager 810 described herein. The communications manager 705 may include a reference signal repetition manager 710, a reference signal manager 715, a receive beam manager 720, a transmit beam manager 725, a SSB manager 730, a beam report manager 735, and a RACH manager 740. Each of these modules may communicate, directly or indirectly, with one another (e.g., via one or more buses).

The reference signal repetition manager 710 may receive, from a first base station with which the UE (e.g., the device 505, device 605, etc.) is connected, an indication that a second base station will transmit a reference signal in repetition on a transmit beam during a RACH procedure for the UE to establish a second connection with the second base station. In some examples, the reference signal repetition manager 710 may receive an indication of a number of repetitions for the reference signal. In some cases, the reference signal includes a CSI-RS. In some cases, the RACH procedure is a contention-free RACH procedure. In some cases, the indication is received in radio resource control signaling.

The reference signal manager 715 may receive the reference signal from the second base station during the RACH procedure according to the received indication. In some examples, the reference signal manager 715 may monitor for the reference signal according to the indicated number of repetitions. In some examples, the reference signal manager 715 may monitor for the reference signal according to the indicated transmit beam.

The receive beam manager 720 may identify a preferred receive beam for the UE based on the received reference signal. In some examples, the receive beam manager 720 may perform a receive beam sweep to receive the reference signal, where the preferred receive beam is identified based on the receive beam sweep. The transmit beam manager 725 may receive an indication of the transmit beam to be used by the second base station to transmit the reference signal in repetition.

The SSB manager 730 may receive an indication of a SSB transmission mode for the SSB. In some examples, the SSB manager 730 may receive an indication of a quasi co-location relationship between the SSB and a synchronization raster SSB. In some cases, the reference signal includes at least a portion of a SSB. In some cases, the SSB transmission mode includes a synchronization raster SSB mode or a UE-specific off-raster mode. In some cases, the RACH procedure is a contention-based RACH procedure.

The beam report manager 735 may transmit a beam report to the first base station, the transmit beam of the second base station determined by the second base station based on the transmitted beam report.

The RACH manager 740 may complete the RACH procedure to transition to dual connectivity operation with both the first base station and the second base station.

Figure 8:
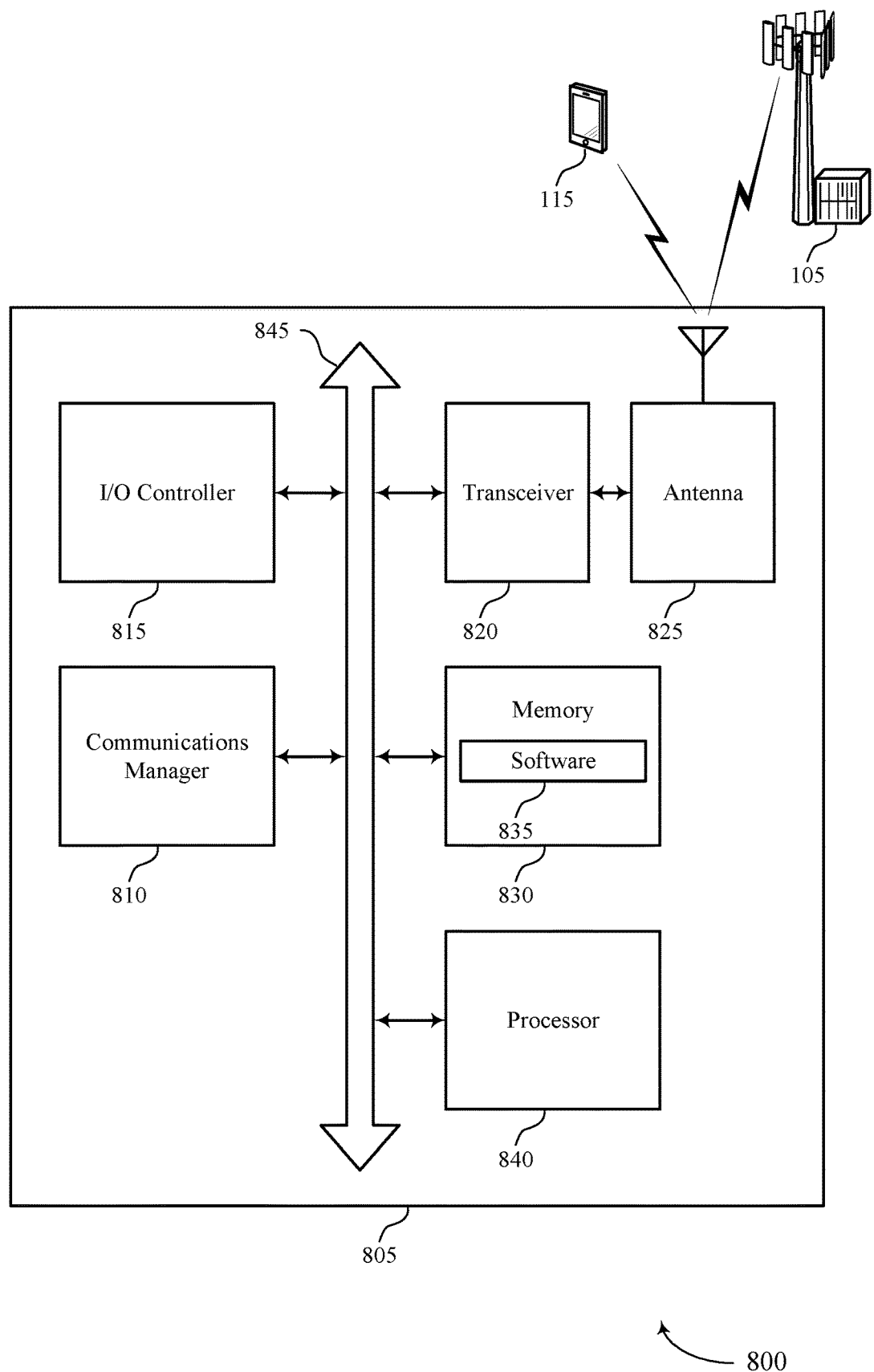
FIG. 8 shows a diagram of a system including a device that supports reference signal repetition signaling in dual connected case in accordance with aspects of the present disclosure.

FIG. 8 shows a diagram of a system 800 including a device 805 that supports reference signal repetition signaling in dual connected case in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a first base station with which the device 805 is connected, an indication that a second base station will transmit a reference signal in repetition on a transmit beam during a RACH procedure for the device 805 to establish a second connection with the second base station, receive the reference signal from the second base station during the RACH procedure according to the received indication, and identify a preferred receive beam for the device 805 based on the received reference signal.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code or software 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling support of reference signal repetition in dual connected case). In some cases, the actions performed by the communications manager 515 and/or communications manager 815 as described herein may facilitate the processor 840 more efficiently causing the device 805 to perform various functions. For example, the processor 840 and/or communications manager 815 may perform actions described herein to more efficiently configure the transceiver 820 to receive reference signal repetitions. Further, processor 840 and/or communications manager 815 may perform actions described herein to realize power savings (e.g., resulting from faster RACH procedures and reduced powering of additional components of device 805 to perform aspects of such faster RACH procedures), reduced number of computations or computational complexity (e.g., as the processor 840 and/or communications manager 815 may more efficiently determine a preferred receive beam, rather than the device 805 and second base station needing to establish a suitable beam pair using full circle beam sweep procedures), etc.

The software 835 may include instructions to implement aspects of the present disclosure, including instructions to support wireless communications. The software 835 may be stored in a non-transitory computer-readable medium such as system memory or other type of memory. In some cases, the software 835 may not be directly executable by the processor 840 but may cause a computer (e.g., when compiled and executed) to perform functions described herein.

Figure 9:
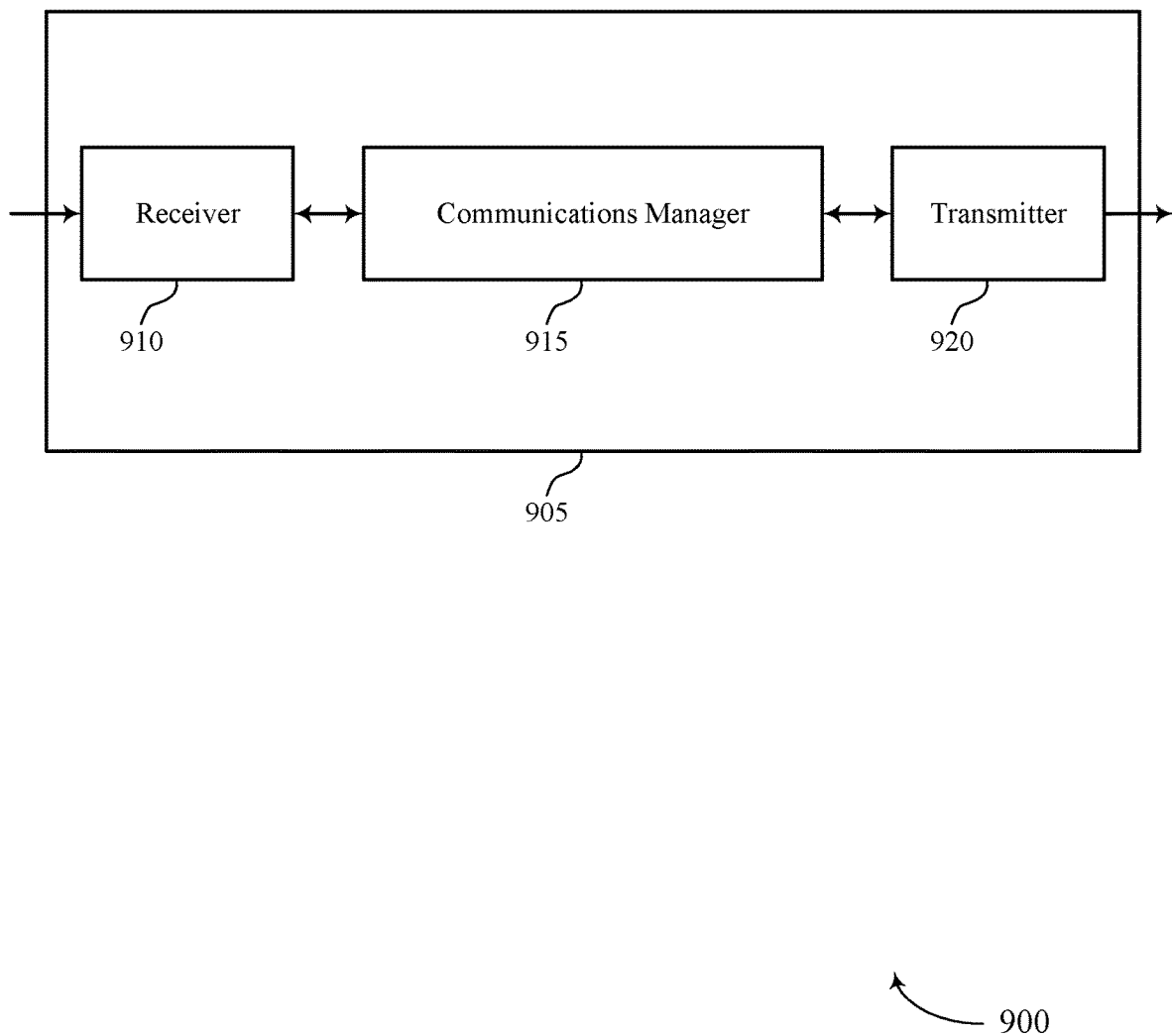
FIGS. 9 and 10 show block diagrams of devices that support reference signal repetition signaling in dual connected case in accordance with aspects of the present disclosure.

FIG. 9 shows a block diagram 900 of a device 905 that supports reference signal repetition signaling in dual connected case in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to signaling support of reference signal repetition in dual connected case, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify that a UE connected with the first base station (e.g., the device 905) is to perform a RACH procedure for the UE to establish a second connection with a second base station and transmit, to the UE, an indication that the second base station will transmit a reference signal in repetition on a transmit beam during the RACH procedure with the UE. The actions performed by the communications manager 915 as described herein may be implemented to realize one or more potential advantages discussed herein. One implementation may allow a device 905 to facilitate improved power consumption and improved quality and reliability of service for one or more served UEs 115 (e.g., as latency associated with UE 115 RACH procedures may be reduced as the device 905 may inform the second base station of a suitable transmit beam for RACH procedures, and the UE 115 may more efficiently determine a preferred receive beam (e.g., rather than the UE 115 and the second base station needing to establish a suitable beam pair using full circle beam sweep procedures)).

The communications manager 915 may also receive, from a first base station at a second base station (e.g., the device 905), an indication that a UE connected to the first base station is to perform a RACH procedure for the UE to establish a second connection with the second base station, identify a transmit beam to use to transmit a reference signal to the UE in response to the received indication, and transmit the reference signal in repetition on the transmit beam. The communications manager 915 may be an example of aspects of the communications manager 1210 described herein. The actions performed by the communications manager 915 as described herein may be implemented to realize one or more potential advantages discussed herein. One implementation may allow a device 905 to save power by avoiding having to perform lengthy RACH procedures (e.g., especially in scenarios where the second base station utilizes beamforming or directional transmissions). Additionally or alternatively, the actions performed by the communications manager 915 as described herein may provide improved quality and reliability of service at UEs 115, as latency associated with RACH procedures may be reduced as the second base station may have the information of a suitable transmit beam prior to transmitting reference signals for UEs 115, and UEs 115 may more efficiently determine a preferred receive beam (e.g., rather than the UE 115 and second base station needing to establish a suitable beam pair using full circle beam sweep procedures).

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
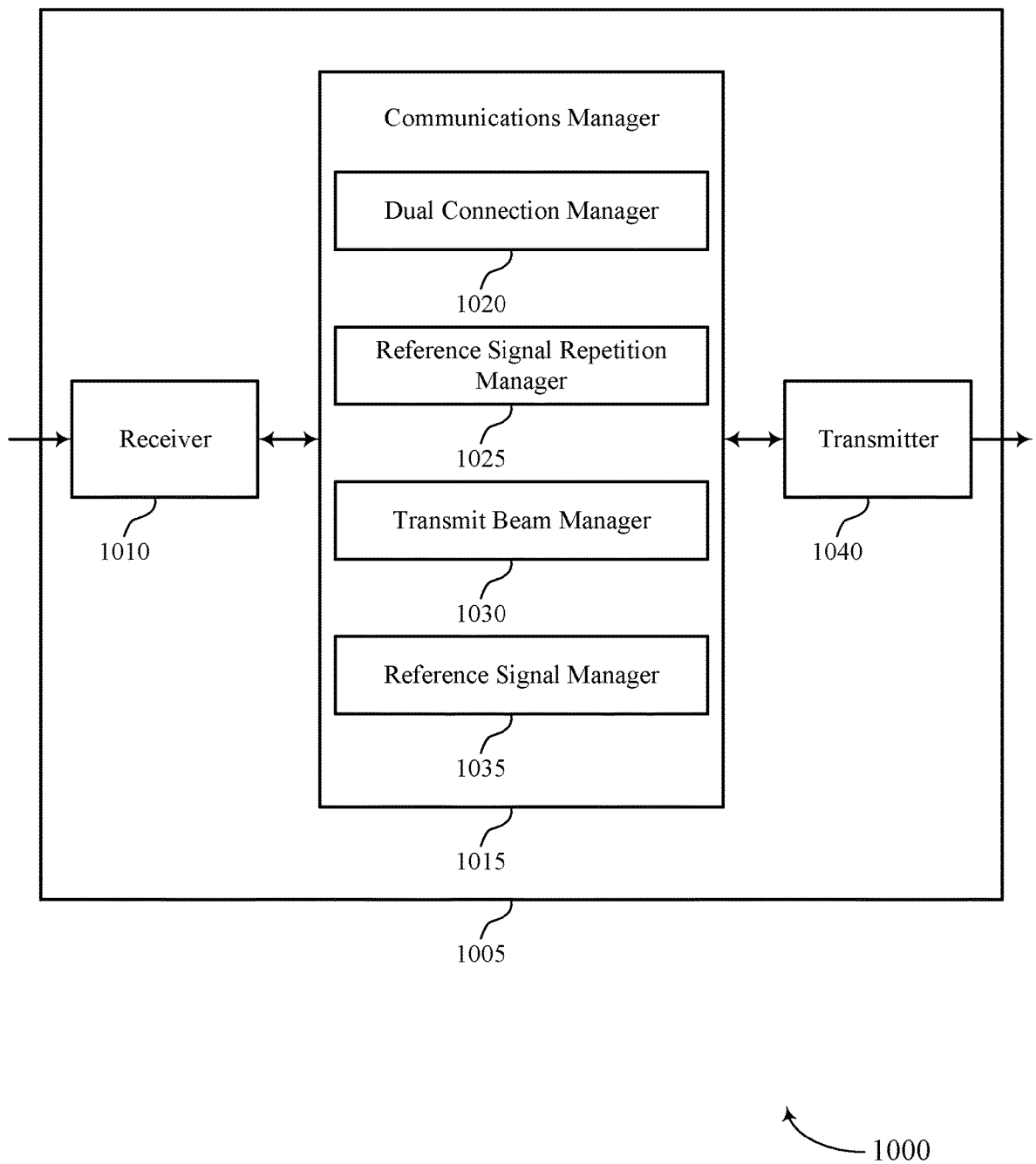

FIG. 10 shows a block diagram 1000 of a device 1005 that supports reference signal repetition signaling in dual connected case in accordance with aspects of the present disclosure. The device 1005 may be an example of aspects of a device 905 or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling support of reference signal repetition in dual connected case, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a dual connection manager 1020, a reference signal repetition manager 1025, a transmit beam manager 1030, and a reference signal manager 1035. The communications manager 1015 may be an example of aspects of the communications manager 1210 described herein.

The dual connection manager 1020 may identify that a UE connected with the first base station is to perform a RACH procedure for the UE to establish a second connection with a second base station. The reference signal repetition manager 1025 may transmit, to the UE, an indication that the second base station will transmit a reference signal in repetition on a transmit beam during the RACH procedure with the UE. The dual connection manager 1020 may receive, from a first base station at a second base station, an indication that a UE connected to the first base station is to perform a RACH procedure for the UE to establish a second connection with the second base station. The transmit beam manager 1030 may identify a transmit beam to use to transmit a reference signal to the UE in response to the received indication. The reference signal manager 1035 may transmit the reference signal in repetition on the transmit beam.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
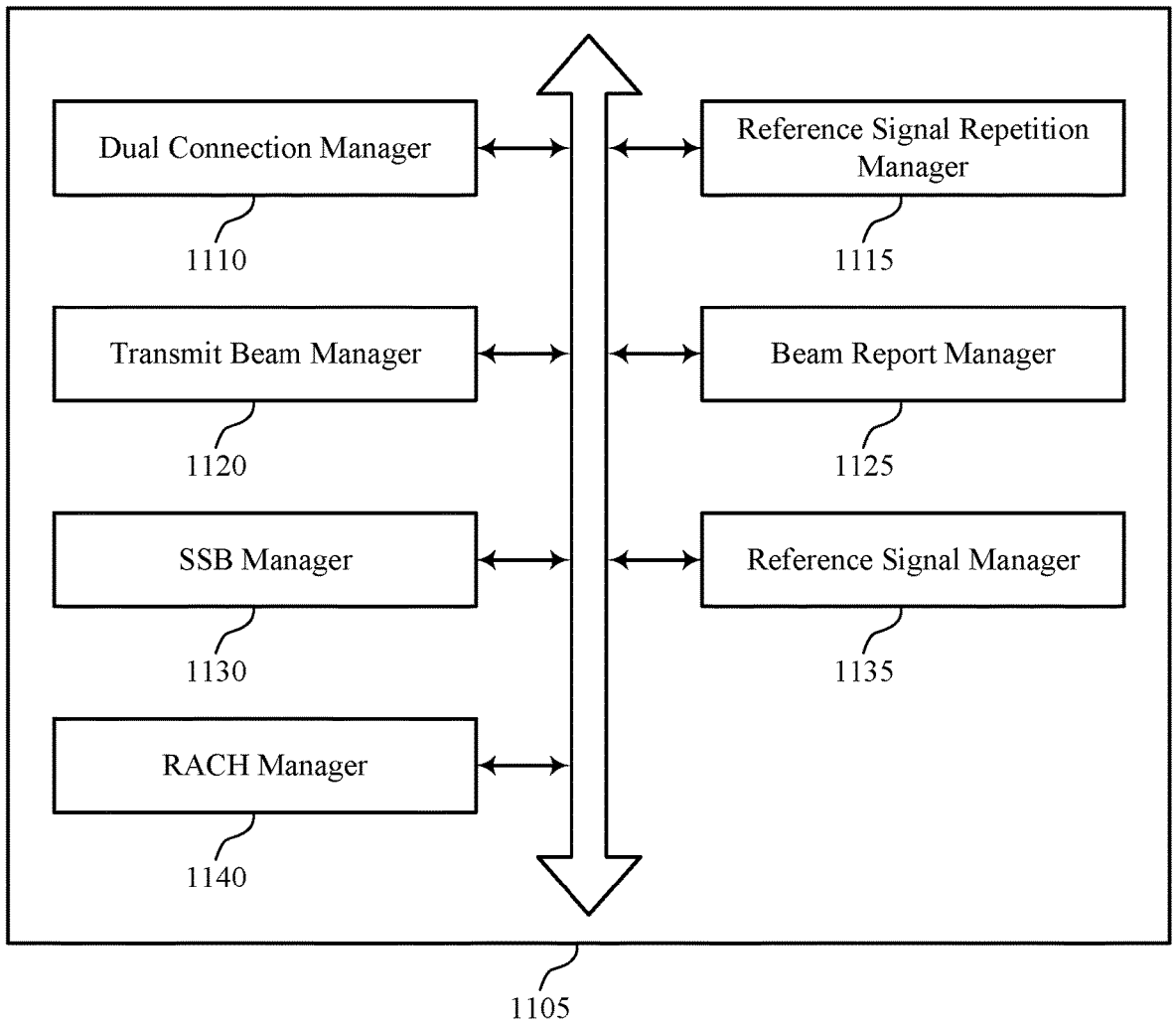
FIG. 11 shows a block diagram of a communications manager that supports reference signal repetition signaling in dual connected case in accordance with aspects of the present disclosure.

FIG. 11 shows a block diagram 1100 of a communications manager 1105 that supports reference signal repetition signaling in dual connected case in accordance with aspects of the present disclosure. The communications manager 1105 may be an example of aspects of a communications manager 915, a communications manager 1015, or a communications manager 1210 described herein. The communications manager 1105 may include a dual connection manager 1110, a reference signal repetition manager 1115, a transmit beam manager 1120, a beam report manager 1125, a SSB manager 1130, a reference signal manager 1135, and a RACH manager 1140. Each of these modules may communicate, directly or indirectly, with one another (e.g., via one or more buses).

The dual connection manager 1110 may identify that a UE connected with the first base station is to perform a RACH procedure for the UE to establish a second connection with a second base station. In some examples, the dual connection manager 1110 may receive, from a first base station at a second base station, an indication that a UE connected to the first base station is to perform a RACH procedure for the UE to establish a second connection with the second base station.

The reference signal repetition manager 1115 may transmit, to the UE, an indication that the second base station will transmit a reference signal in repetition on a transmit beam during the RACH procedure with the UE. In some examples, the reference signal repetition manager 1115 may transmit, to the UE, an indication of a number of repetitions for the reference signal. In some examples, the reference signal repetition manager 1115 may transmit, to the second base station, an indication of a number of repetitions for the reference signal. In some examples, the reference signal repetition manager 1115 may identify a number of repetitions to use to transmit the reference signal. In some examples, the reference signal repetition manager 1115 may receive, from the first base station, an indication of the number of repetitions. In some examples, the reference signal repetition manager 1115 may identify the number of repetitions based on the received indication. In some cases, the reference signal includes a CSI-RS. In some cases, the indication is transmitted in radio resource control signaling.

The transmit beam manager 1120 may identify a transmit beam to use to transmit a reference signal to the UE in response to the received indication. In some examples, the transmit beam manager 1120 may transmit, to the UE, an indication of the transmit beam to be used by the second base station to transmit the reference signal in repetition. In some examples, the transmit beam manager 1120 may determine the transmit beam based on the received beam report. In some examples, the transmit beam manager 1120 may receive, from the first base station, an indication of the transmit beam that the second base station is to use to transmit the reference signal.

The reference signal manager 1135 may transmit the reference signal in repetition on the transmit beam. In some cases, the reference signal includes a CSI-RS. The beam report manager 1125 may receive a beam report from the UE.

The SSB manager 1130 may transmit an indication of a SSB transmission mode for the SSB. In some examples, the SSB manager 1130 may transmit an indication of a quasi co-location relationship between the SSB and a synchronization raster SSB. In some cases, the reference signal includes at least a portion of a SSB.

The RACH manager 1140 may receive a RACH transmission from the UE in response to the transmitted reference signal.

Figure 12:
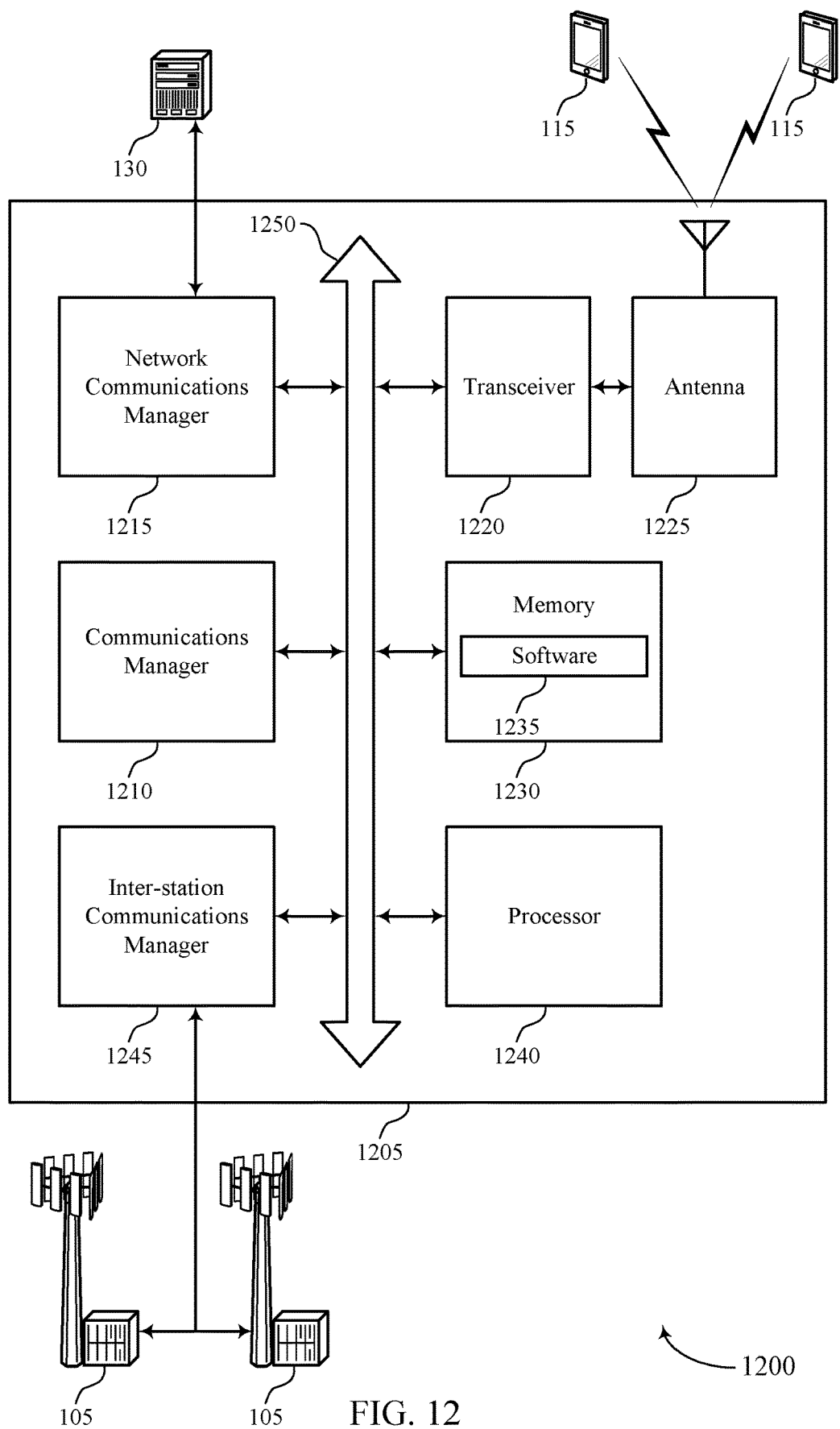
FIG. 12 shows a diagram of a system including a device that supports reference signal repetition signaling in dual connected case in accordance with aspects of the present disclosure.

FIG. 12 shows a diagram of a system 1200 including a device 1205 that supports reference signal repetition signaling in dual connected case in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify that a UE connected with the first base station is to perform a RACH procedure for the UE to establish a second connection with a second base station and transmit, to the UE, an indication that the second base station will transmit a reference signal in repetition on a transmit beam during the RACH procedure with the UE. The communications manager 1210 may also receive, from a first base station at a second base station, an indication that a UE connected to the first base station is to perform a RACH procedure for the UE to establish a second connection with the second base station, identify a transmit beam to use to transmit a reference signal to the UE in response to the received indication, and transmit the reference signal in repetition on the transmit beam.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable software 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting signaling support of reference signal repetition in dual connected case). In some cases, the actions performed by the communications manager 915 and/or communications manager 1210 as described herein may facilitate the processor 1240 more efficiently causing the device 1205 to perform various functions. For example, the processor 1240 and/or communications manager 1210 may perform actions described herein to more efficiently configure the transceiver 1220 to transmit reference signal repetitions (e.g., rather than establishing a suitable beam pair using full circle beam sweep procedures). Further, processor 1240 and/or communications manager 1210 may perform actions described herein to realize power savings (e.g., resulting from faster RACH procedures and reduced powering of additional components of device 1205 to perform aspects of such faster RACH procedures), reduced number of computations or computational complexity (e.g., as the processor 1240 and/or communications manager 1210 may more efficiently determine a preferred transmit beam, rather than second base station needing to establish a suitable beam pair using full circle beam sweep procedures), etc.

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
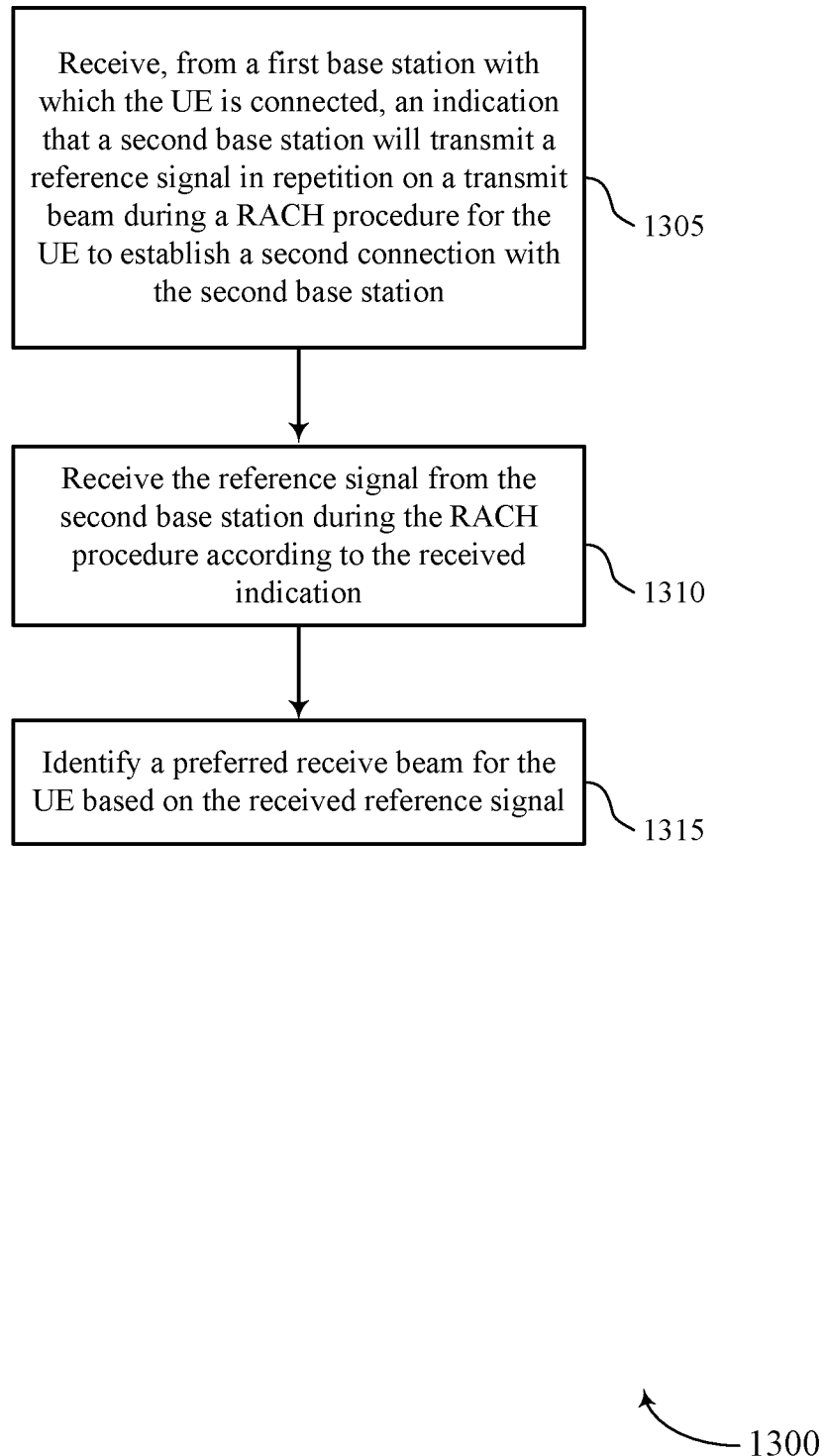
FIGS. 13 through 18 show flowcharts illustrating methods that support reference signal repetition signaling in dual connected case in accordance with aspects of the present disclosure.

FIG. 13 shows a flowchart illustrating a method 1300 that supports reference signal repetition signaling in dual connected case in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a first base station with which the UE is connected, an indication that a second base station will transmit a reference signal in repetition on a transmit beam during a RACH procedure for the UE to establish a second connection with the second base station. The operations of 1305 may be performed according to the methods described herein. In some examples, aspects of the operations of 1305 may be performed by a reference signal repetition manager as described with reference to FIGS. 5 through 8.

At 1310, the UE may receive the reference signal from the second base station during the RACH procedure according to the received indication. The operations of 1310 may be performed according to the methods described herein. In some examples, aspects of the operations of 1310 may be performed by a reference signal manager as described with reference to FIGS. 5 through 8.

At 1315, the UE may identify a preferred receive beam for the UE based on the received reference signal. The operations of 1315 may be performed according to the methods described herein. In some examples, aspects of the operations of 1315 may be performed by a receive beam manager as described with reference to FIGS. 5 through 8.

Figure 14:
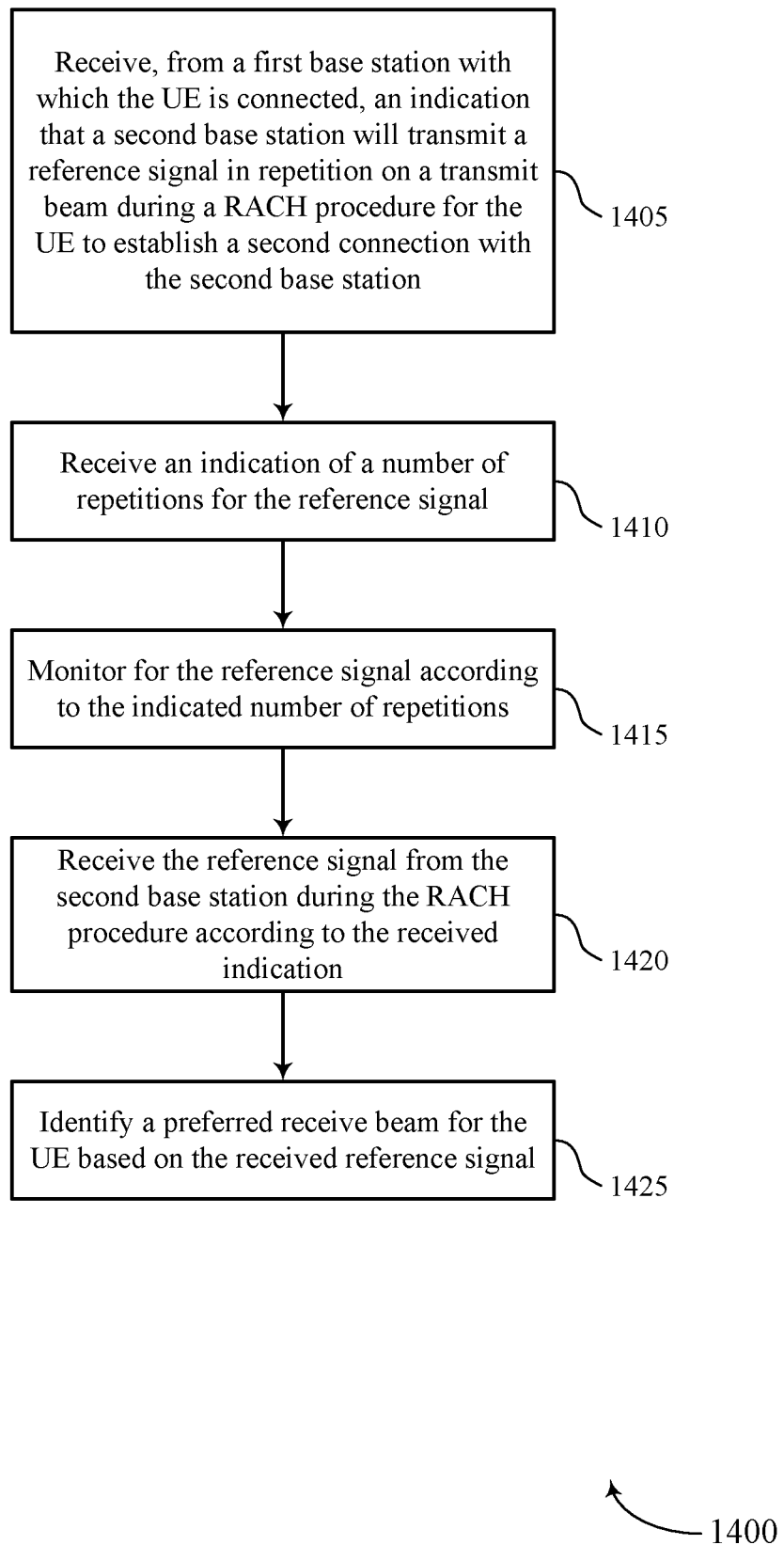

FIG. 14 shows a flowchart illustrating a method 1400 that supports reference signal repetition signaling in dual connected case in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a first base station with which the UE is connected, an indication that a second base station will transmit a reference signal in repetition on a transmit beam during a RACH procedure for the UE to establish a second connection with the second base station. The operations of 1405 may be performed according to the methods described herein. In some examples, aspects of the operations of 1405 may be performed by a reference signal repetition manager as described with reference to FIGS. 5 through 8.

At 1410, the UE may receive an indication of a number of repetitions for the reference signal. The operations of 1410 may be performed according to the methods described herein. In some examples, aspects of the operations of 1410 may be performed by a reference signal repetition manager as described with reference to FIGS. 5 through 8.

At 1415, the UE may monitor for the reference signal according to the indicated number of repetitions. The operations of 1415 may be performed according to the methods described herein. In some examples, aspects of the operations of 1415 may be performed by a reference signal manager as described with reference to FIGS. 5 through 8.

At 1420, the UE may receive the reference signal from the second base station during the RACH procedure according to the received indication. The operations of 1420 may be performed according to the methods described herein. In some examples, aspects of the operations of 1420 may be performed by a reference signal manager as described with reference to FIGS. 5 through 8.

At 1425, the UE may identify a preferred receive beam for the UE based on the received reference signal. The operations of 1425 may be performed according to the methods described herein. In some examples, aspects of the operations of 1425 may be performed by a receive beam manager as described with reference to FIGS. 5 through 8.

Figure 15:
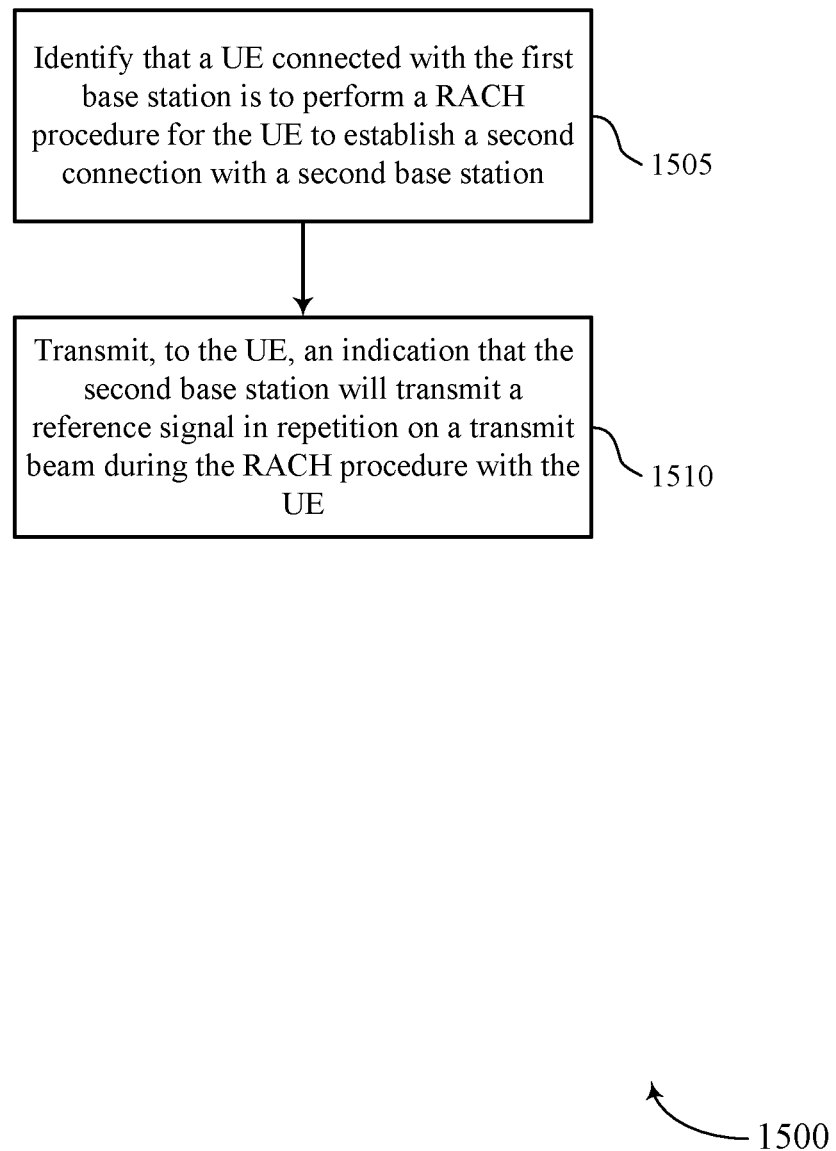

FIG. 15 shows a flowchart illustrating a method 1500 that supports reference signal repetition signaling in dual connected case in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may identify that a UE connected with the first base station is to perform a RACH procedure for the UE to establish a second connection with a second base station. The operations of 1505 may be performed according to the methods described herein. In some examples, aspects of the operations of 1505 may be performed by a dual connection manager as described with reference to FIGS. 9 through 12.

At 1510, the base station may transmit, to the UE, an indication that the second base station will transmit a reference signal in repetition on a transmit beam during the RACH procedure with the UE. The operations of 1510 may be performed according to the methods described herein. In some examples, aspects of the operations of 1510 may be performed by a reference signal repetition manager as described with reference to FIGS. 9 through 12.

Figure 16:
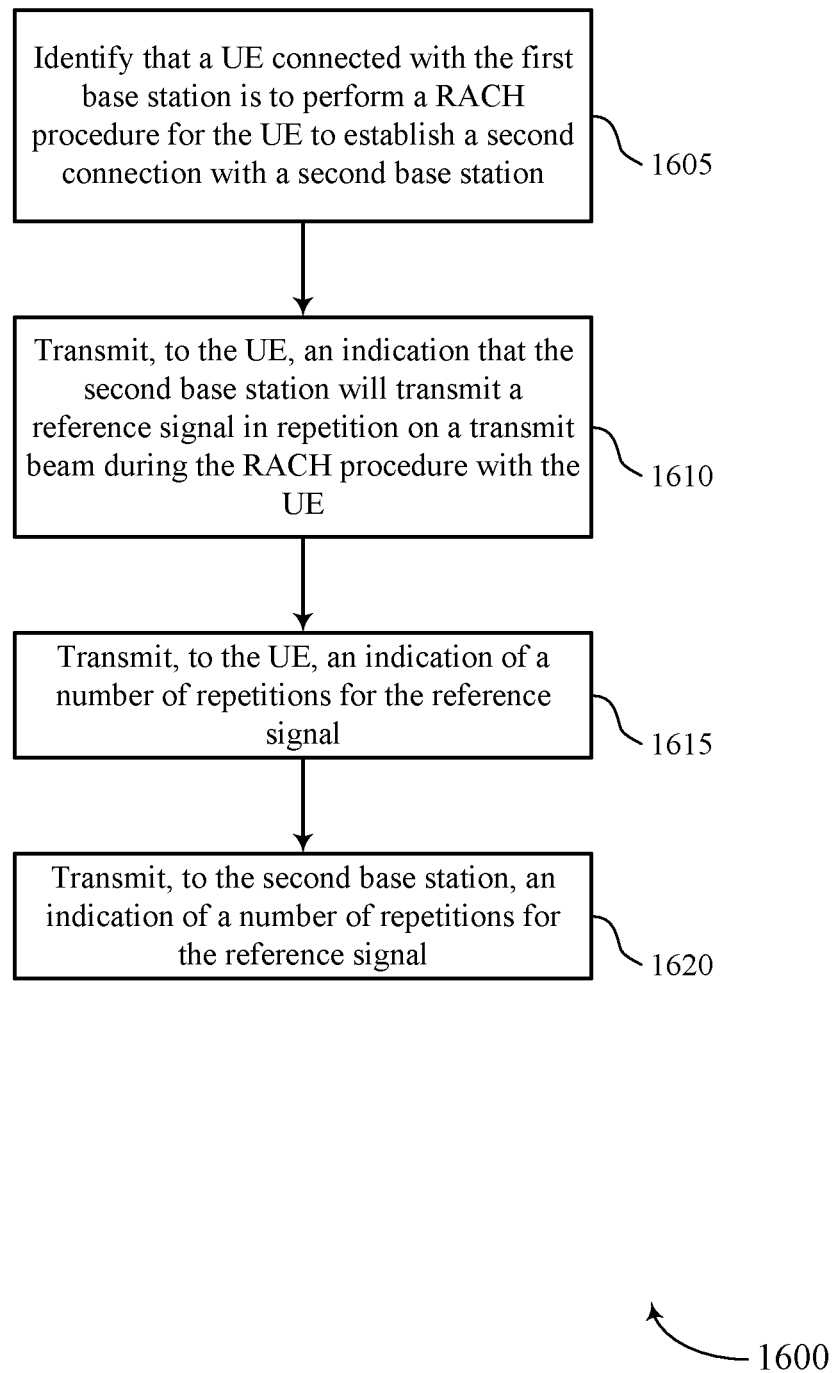

FIG. 16 shows a flowchart illustrating a method 1600 that supports reference signal repetition signaling in dual connected case in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify that a UE connected with the first base station is to perform a RACH procedure for the UE to establish a second connection with a second base station. The operations of 1605 may be performed according to the methods described herein. In some examples, aspects of the operations of 1605 may be performed by a dual connection manager as described with reference to FIGS. 9 through 12.

At 1610, the base station may transmit, to the UE, an indication that the second base station will transmit a reference signal in repetition on a transmit beam during the RACH procedure with the UE. The operations of 1610 may be performed according to the methods described herein. In some examples, aspects of the operations of 1610 may be performed by a reference signal repetition manager as described with reference to FIGS. 9 through 12.

At 1615, the base station may transmit, to the UE, an indication of a number of repetitions for the reference signal. The operations of 1615 may be performed according to the methods described herein. In some examples, aspects of the operations of 1615 may be performed by a reference signal repetition manager as described with reference to FIGS. 9 through 12.

At 1620, the base station may transmit, to the second base station, an indication of a number of repetitions for the reference signal. The operations of 1620 may be performed according to the methods described herein. In some examples, aspects of the operations of 1620 may be performed by a reference signal repetition manager as described with reference to FIGS. 9 through 12.

Figure 17:
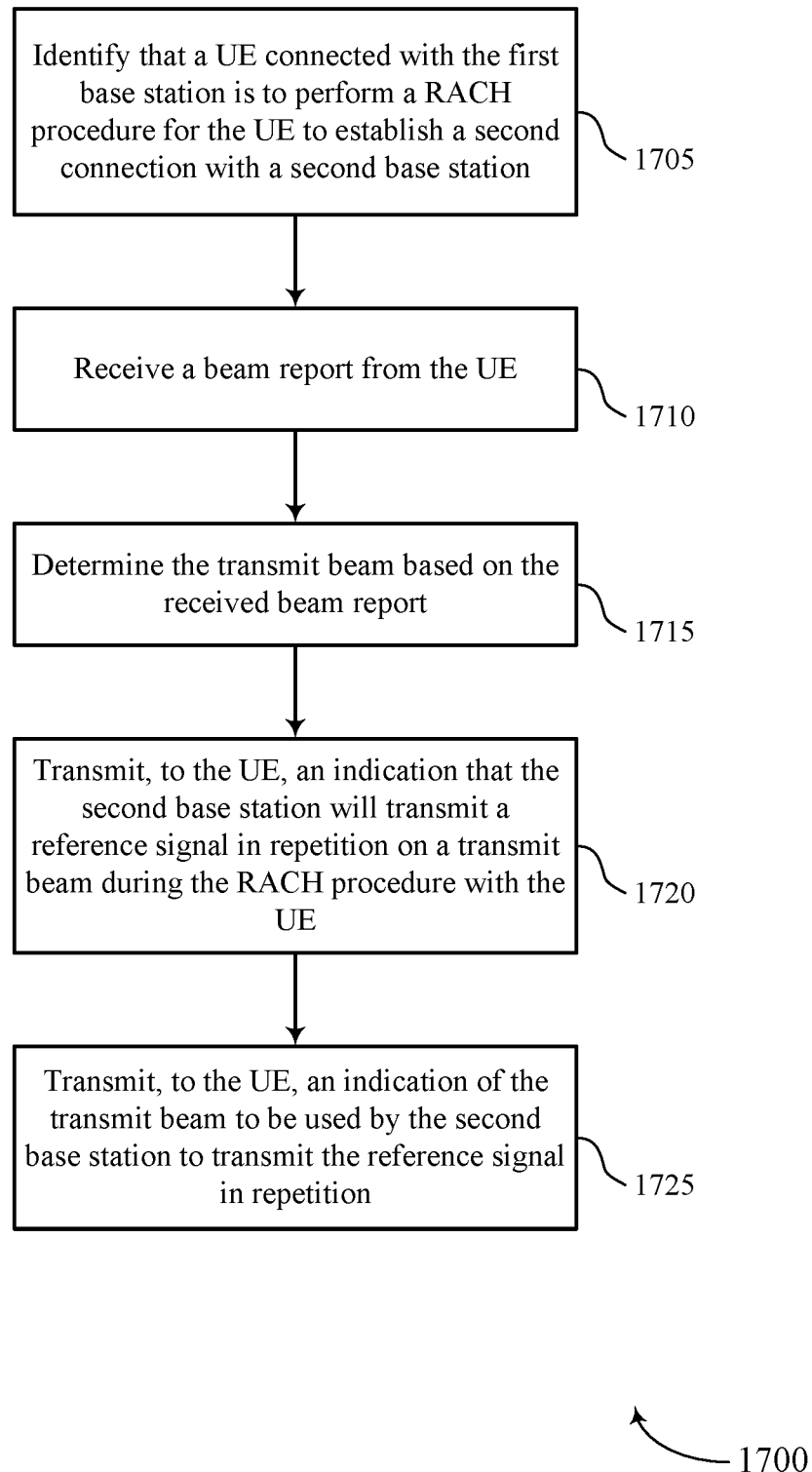

FIG. 17 shows a flowchart illustrating a method 1700 that supports reference signal repetition signaling in dual connected case in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify that a UE connected with the first base station is to perform a RACH procedure for the UE to establish a second connection with a second base station. The operations of 1705 may be performed according to the methods described herein. In some examples, aspects of the operations of 1705 may be performed by a dual connection manager as described with reference to FIGS. 9 through 12.

At 1710, the base station may receive a beam report from the UE. The operations of 1710 may be performed according to the methods described herein. In some examples, aspects of the operations of 1710 may be performed by a beam report manager as described with reference to FIGS. 9 through 12.

At 1715, the base station may determine the transmit beam based on the received beam report. The operations of 1715 may be performed according to the methods described herein. In some examples, aspects of the operations of 1715 may be performed by a transmit beam manager as described with reference to FIGS. 9 through 12.

At 1720, the base station may transmit, to the UE, an indication that the second base station will transmit a reference signal in repetition on a transmit beam during the RACH procedure with the UE. The operations of 1720 may be performed according to the methods described herein. In some examples, aspects of the operations of 1720 may be performed by a reference signal repetition manager as described with reference to FIGS. 9 through 12.

At 1725, the base station may transmit, to the UE, an indication of the transmit beam to be used by the second base station to transmit the reference signal in repetition. The operations of 1725 may be performed according to the methods described herein. In some examples, aspects of the operations of 1725 may be performed by a transmit beam manager as described with reference to FIGS. 9 through 12.

Figure 18:
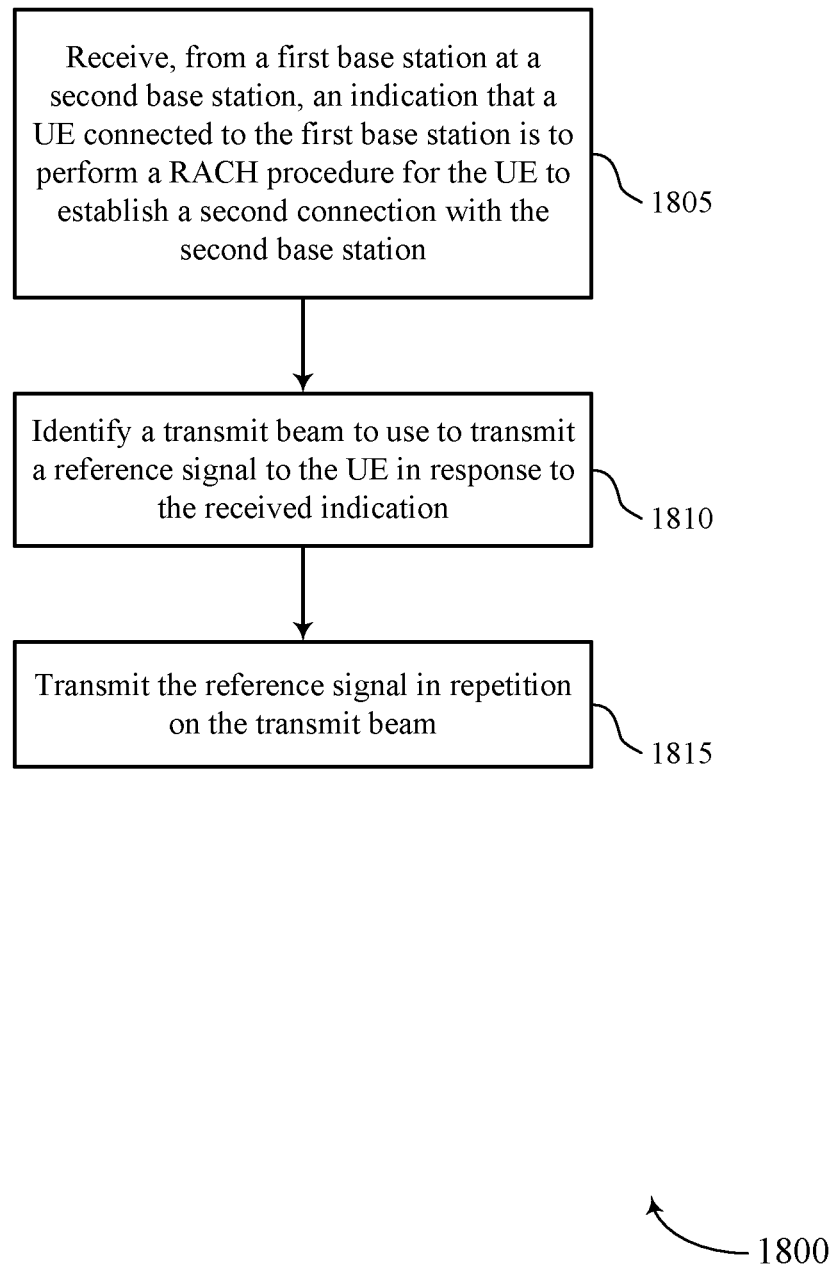

FIG. 18 shows a flowchart illustrating a method 1800 that supports reference signal repetition signaling in dual connected case in accordance with aspects of the present disclosure. The operations of method 1800 may be implemented by a base station 105 (e.g., a second base station, or a secondary base station) or its components as described herein. For example, the operations of method 1800 may be performed by a communications manager as described with reference to FIGS. 9 through 12. In some examples, a second base station may execute a set of instructions to control the functional elements of the second base station to perform the functions described below. Additionally or alternatively, a second base station may perform aspects of the functions described below using special-purpose hardware.

At 1805, the second base station may receive, from a first base station (e.g., a master node), an indication that a UE connected to the first base station is to perform a RACH procedure for the UE to establish a second connection with the second base station. The operations of 1805 may be performed according to the methods described herein. In some examples, aspects of the operations of 1805 may be performed by a dual connection manager as described with reference to FIGS. 9 through 12.

At 1810, the second base station may identify a transmit beam to use to transmit a reference signal to the UE in response to the received indication. The operations of 1810 may be performed according to the methods described herein. In some examples, aspects of the operations of 1810 may be performed by a transmit beam manager as described with reference to FIGS. 9 through 12.

At 1815, the second base station may transmit the reference signal in repetition on the transmit beam. The operations of 1815 may be performed according to the methods described herein. In some examples, aspects of the operations of 1815 may be performed by a reference signal manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a first base station with which the UE is connected, an indication that a second base station will transmit a reference signal in repetition using a transmit beam of the second base station during a random access channel (RACH) procedure for the UE to establish a second connection with the second base station;
   receiving, from the first base station, a second indication of a number of repetitions for the reference signal;
   receiving the reference signal from the second base station during the RACH procedure according to the received indication that the second base station will transmit the reference signal in repetition and based at least in part on the received indication of the number of repetitions for the reference signal; and
   identifying a preferred receive beam for the UE based at least in part on the received reference signal.

2. The method of claim 1, further comprising:
   monitoring for the reference signal according to the indicated number of repetitions.

3. The method of claim 1, further comprising:
   receiving an indication of the transmit beam to be used by the second base station to transmit the reference signal in repetition; and
   monitoring for the reference signal according to the indicated transmit beam.

4. The method of claim 1, wherein receiving the reference signal comprises:
   performing a receive beam sweep to receive the reference signal, wherein the preferred receive beam is identified based at least in part on the receive beam sweep.

5. The method of claim 1, wherein the reference signal comprises a channel state information reference signal (CSI-RS).

6. The method of claim 5, wherein the RACH procedure is a contention-free RACH procedure.

7. The method of claim 1, wherein the reference signal comprises at least a portion of a synchronization signal block (SSB).

8. The method of claim 7, further comprising:
   receiving an indication of a SSB transmission mode for the SSB.

9. A method for wireless communication at a user equipment (UE), comprising:
   receiving, from a first base station with which the UE is connected, an indication that a second base station will transmit a reference signal in repetition using a transmit beam of the second base station during a random access channel (RACH) procedure for the UE to establish a second connection with the second base station, wherein the reference signal comprises at least a portion of a synchronization signal block (SSB);

receiving an indication of a SSB transmission mode for the SSB, wherein the SSB transmission mode comprises a synchronization raster SSB mode or a UE-specific off-raster mode;

receiving the reference signal from the second base station during the RACH procedure according to the received indication; and identifying a preferred receive beam for the UE based at least in part on the received reference signal.

10. A method of for wireless communication at a user equipment (UE), further comprising:

receiving, from a first base station with which the UE is connected, an indication that a second base station will transmit a reference signal in repetition using a transmit beam of the second base station during a random access channel (RACH) procedure for the UE to establish a second connection with the second base station;

receiving an indication of a quasi co-location relationship between a synchronization signal block (SSB) and a synchronization raster SSB;

receiving the reference signal from the second base station during the RACH procedure according to the received indication, wherein the reference signal comprises at least a portion of the SSB; and identifying a preferred receive beam for the UE based at least in part on the received reference signal.

11. The method of claim 7, wherein the RACH procedure is a contention-based RACH procedure.

12. The method of claim 1, wherein the indication is received in radio resource control signaling.

13. The method of claim 1, further comprising:
transmitting a beam report to the first base station, the transmit beam of the second base station determined by the second base station based at least in part on the transmitted beam report.

14. The method of claim 1, further comprising:
completing the RACH procedure to transition to dual connectivity operation with both the first base station and the second base station.

15. A method for wireless communication at a first base station, comprising:

identifying that a user equipment (UE) connected with the first base station is to perform a random access channel (RACH) procedure for the UE to establish a second connection with a second base station;

transmitting, to the UE, an indication that the second base station will transmit a reference signal in repetition using a transmit beam of the second base station during the RACH procedure with the UE; and transmitting, to the second base station, an indication of a number of repetitions for the reference signal.

16. The method of claim 15, further comprising:
transmitting, to the UE, an indication of the number of repetitions for the reference signal.

17. The method of claim 15, further comprising:
transmitting, to the UE, an indication of the transmit beam to be used by the second base station to transmit the reference signal in repetition.

18. The method of claim 17, further comprising:
receiving a beam report from the UE; and
determining the transmit beam based at least in part on the received beam report.

19. The method of claim 15, wherein the reference signal comprises a channel state information reference signal (CSI-RS).

20. The method of claim 15, wherein the reference signal comprises at least a portion of a synchronization signal block (SSB).

21. The method of claim 20, further comprising:
transmitting an indication of a SSB transmission mode for the SSB.

22. A method for wireless communication at a first base station, comprising:

identifying that a user equipment (UE) connected with the first base station is to perform a random access channel (RACH) procedure for the UE to establish a second connection with a second base station;

transmitting an indication of a quasi co-location relationship between a synchronization signal block (SSB) and a synchronization raster SSB; and transmitting, to the UE, an indication that the second base station will transmit a reference signal in repetition using a transmit beam of the second base station during the RACH procedure with the UE, wherein the reference signal comprises at least a portion of the SSB.

23. The method of claim 15, wherein the indication is transmitted in radio resource control signaling.

24. A method for wireless communication at a second base station, comprising:

receiving, from a first base station, an indication that a user equipment (UE) connected to the first base station is to perform a random access channel (RACH) procedure for the UE to establish a second connection with the second base station;

receiving, from the first base station, an indication of a number of repetitions to use to transmit a reference signal;

identifying the number of repetitions to use to transmit the reference signal based at least in part on the received indication of the number of repetitions;

identifying a transmit beam to use to transmit the reference signal to the UE in response to receiving the indication that that the UE is to perform the RACH procedure; and transmitting the reference signal in repetition on the transmit beam.

25. The method of claim 24, further comprising:
receiving, from the first base station, an indication of the transmit beam that the second base station is to use to transmit the reference signal.

26. The method of claim 24, further comprising:
receiving a RACH transmission from the UE in response to the transmitted reference signal.

27. The method of claim 24, wherein the reference signal comprises a channel state information reference signal (CSI-RS).

28. The method of claim 24, wherein the reference signal comprises at least a portion of a synchronization signal block (SSB).

29. An apparatus for wireless communication at a user equipment (UE), comprising: a processor, memory in electronic communication with the processor; and instructions stored in the memory and executable by the processor to cause the apparatus to:

receive, from a first base station with which the UE is connected, an indication that a second base station will transmit a reference signal in repetition using a transmit beam of the second base station during a random access channel (RACH) procedure for the UE to establish a second connection with the second base station;

receive, from the first base station, a second indication of a number of repetitions for the reference signal;

receive the reference signal from the second base station during the RACH procedure according to the received indication that the second base station will transmit the reference signal in repetition and based at least in part on the received indication of the number of repetitions for the reference signal; and identify a preferred receive beam for the UE based at least in part on the received reference signal.

30. The apparatus of claim 29, wherein the instructions are further executable by the processor to cause the apparatus to:

monitor for the reference signal according to the indicated number of repetitions.

31. The apparatus of claim 29, wherein the instructions are further executable by the processor to cause the apparatus to:

receive an indication of the transmit beam to be used by the second base station to transmit the reference signal in repetition; and monitor for the reference signal according to the indicated transmit beam.

32. The apparatus of claim 29, wherein the instructions to receive the reference signal are executable by the processor to cause the apparatus to:

perform a receive beam sweep to receive the reference signal, wherein the preferred receive beam is identified based at least in part on the receive beam sweep.

33. The apparatus of claim 29, wherein the instructions are further executable by the processor to cause the apparatus to:

transmit a beam report to the first base station, the transmit beam of the second base station determined by the second base station based at least in part on the transmitted beam report.

34. The apparatus of claim 29, wherein the instructions are further executable by the processor to cause the apparatus to:

complete the RACH procedure to transition to dual connectivity operation with both the first base station and the second base station.

35. An apparatus for wireless communication at a first base station, comprising: a processor, memory in electronic communication with the processor; and instructions stored in the memory and executable by the processor to cause the apparatus to:

identify that a user equipment (UE) connected with the first base station is to perform a random access channel (RACH) procedure for the UE to establish a second connection with a second base station;

transmit, to the UE, an indication that the second base station will transmit a reference signal in repetition using a transmit beam of the second base station during the RACH procedure with the UE; and transmit, to the second base station, an indication of a number of repetitions for the reference signal.

36. The apparatus of claim 35, wherein the instructions are further executable by the processor to cause the apparatus to:

transmit, to the UE, an indication of the number of repetitions for the reference signal.

37. The apparatus of claim 35, wherein the instructions are further executable by the processor to cause the apparatus to:

transmit, to the UE, an indication of the transmit beam to be used by the second base station to transmit the reference signal in repetition.

38. The apparatus of claim 37, wherein the instructions are further executable by the processor to cause the apparatus to:

receive a beam report from the UE; and determine the transmit beam based at least in part on the received beam report.

39. An apparatus for wireless communication at a second base station, comprising: a processor, memory in electronic communication with the processor; and instructions stored in the memory and executable by the processor to cause the apparatus to:

receive, from a first base station, an indication that a user equipment (UE) connected to the first base station is to perform a random access channel (RACH) procedure for the UE to establish a second connection with the second base station;

receive, from the first base station, an indication of a number of repetitions to use to transmit a reference signal;

identify the number of repetitions to use to transmit the reference signal based at least in part on the received indication of the number of repetitions;

identify a transmit beam to use to transmit the reference signal to the UE in response to receiving the indication that that the UE is to perform the RACH procedure; and transmit the reference signal in repetition on the transmit beam.

40. The apparatus of claim 39, wherein the instructions are further executable by the processor to cause the apparatus to:

receive, from the first base station, an indication of the transmit beam that the second base station is to use to transmit the reference signal.

41. The apparatus of claim 39, wherein the instructions are further executable by the processor to cause the apparatus to:

receive a RACH transmission from the UE in response to the transmitted reference signal.

42. An apparatus for wireless communication at a user equipment (UE), comprising: a processor, memory in electronic communication with the processor; and instructions stored in the memory and executable by the processor to cause the apparatus to:

receive, from a first base station with which the UE is connected, an indication that a second base station will transmit a reference signal in repetition using a transmit beam of the second base station during a random access channel (RACH) procedure for the UE to establish a second connection with the second base station, wherein the reference signal comprises at least a portion of a synchronization signal block (SSB);

receive an indication of a SSB transmission mode for the SSB, wherein the SSB transmission mode comprises a synchronization raster SSB mode or a UE-specific off-raster mode;

receive the reference signal from the second base station during the RACH procedure according to the received indication; and identify a preferred receive beam for the UE based at least in part on the received reference signal.

43. An apparatus for wireless communication at a user equipment (UE), comprising: a processor, memory in electronic communication with the processor; and instructions stored in the memory and executable by the processor to cause the apparatus to:

receive, from a first base station with which the UE is connected, an indication that a second base station will transmit a reference signal in repetition using a transmit beam of the second base station during a random access channel (RACH) procedure for the UE to establish a second connection with the second base station;

receive an indication of a quasi co-location relationship between a synchronization signal block (SSB) and a synchronization raster SSB;

receive the reference signal from the second base station during the RACH procedure according to the received indication, wherein the reference signal comprises at least a portion of the SSB; and identify a preferred receive beam for the UE based at least in part on the received reference signal.

44. An apparatus for wireless communication at a first base station, comprising: a processor, memory in electronic communication with the processor; and instructions stored in the memory and executable by the processor to cause the apparatus to:

identify that a user equipment (UE) connected with the first base station is to perform a random access channel (RACH) procedure for the UE to establish a second connection with a second base station;

transmit an indication of a quasi co-location relationship between a synchronization signal block (SSB) and a synchronization raster SSB; and transmit, to the UE, an indication that the second base station will transmit a reference signal in repetition using a transmit beam of the second base station during the RACH procedure with the UE, wherein the reference signal comprises at least a portion of the SSB.

\* \* \* \* \*